(12) United States Patent
Neitzel et al.

(10) Patent No.: US 9,122,764 B2
(45) Date of Patent: *Sep. 1, 2015

(54) METHODS AND APPARATUS TO ACCESS PROCESS DATA STORED ON A SERVER

(75) Inventors: Lee Allen Neitzel, Austin, TX (US); Ling Zhou, Austin, TX (US); Mark Nixon, Round Rock, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 298 days.

This patent is subject to a terminal disclaimer.

(21) Appl. No.: 12/730,895

(22) Filed: Mar. 24, 2010

(65) Prior Publication Data

US 2011/0238780 A1 Sep. 29, 2011

(51) Int. Cl.
| | | |
|---|---|---|
| *G06F 15/16* | (2006.01) | |
| *G06F 7/04* | (2006.01) | |
| *G06F 3/00* | (2006.01) | |
| *G06F 17/30* | (2006.01) | |
| *G06F 9/44* | (2006.01) | |
| *G05B 19/408* | (2006.01) | |
| *H04L 29/08* | (2006.01) | |

(52) U.S. Cl.
CPC ........ *G06F 17/30893* (2013.01); *G05B 19/408* (2013.01); *G06F 9/4443* (2013.01); *H04L 29/0809* (2013.01)

(58) Field of Classification Search
CPC ............................. G06F 9/4443; G05B 19/408
USPC .......... 709/217, 227, 246; 715/206, 236, 741, 715/772
See application file for complete search history.

(56) References Cited

U.S. PATENT DOCUMENTS

| | | | |
|---|---|---|---|
| 5,339,392 | A | 8/1994 | Risberg et al. |
| 5,390,314 | A | 2/1995 | Swanson |
| 5,796,602 | A | 8/1998 | Wellan et al. |
| 5,828,851 | A | 10/1998 | Nixon et al. |
| 6,256,635 | B1 * | 7/2001 | Arrouye et al. ........................ 1/1 |

(Continued)

FOREIGN PATENT DOCUMENTS

| | | |
|---|---|---|
| CN | 101352057 | 1/2009 |
| EP | 1772785 | 4/2007 |

(Continued)

OTHER PUBLICATIONS

Software Toolbox, "OPC Web Client," product details, retrieved Mar. 24, 2010, www.opcwebclient.com/html/product_details.html, Jun. 22, 2009, 1 page.

(Continued)

*Primary Examiner* — Aftab N. Khan
(74) *Attorney, Agent, or Firm* — Hanley, Flight & Zimmerman, LLC

(57) ABSTRACT

Example methods and apparatus to access process data stored on a server are disclosed. A disclosed example method includes receiving a request to access process data via a web browser, identifying a server that stores at least a portion of the process data, wherein the server is associated with an interoperability data packing format, accessing the server to receive the process data, converting the process data from a format associated with the interoperability data packing format to a web browsing format, and embedding at least a first portion of the converted process data into at least one data field for display via the web browser.

24 Claims, 13 Drawing Sheets

(56) References Cited

U.S. PATENT DOCUMENTS

| | | | |
|---|---|---|---|
| 6,282,548 | B1 | 8/2001 | Burner et al. |
| 6,308,168 | B1 | 10/2001 | Dovich et al. |
| 6,370,569 | B1 | 4/2002 | Austin |
| 6,581,101 | B2 | 6/2003 | Villalpando |
| 6,618,630 | B1 | 9/2003 | Jundt et al. |
| 6,763,395 | B1 | 7/2004 | Austin |
| 6,795,830 | B1 | 9/2004 | Banerjee et al. |
| 6,970,771 | B1 | 11/2005 | Preiss et al. |
| 7,080,083 | B2 | 7/2006 | Kim et al. |
| 7,146,230 | B2 | 12/2006 | Glanzer et al. |
| 7,146,564 | B2 | 12/2006 | Kim et al. |
| 7,168,035 | B1 | 1/2007 | Bell et al. |
| 7,178,103 | B2 | 2/2007 | Humphrey et al. |
| 7,251,534 | B2 | 7/2007 | Walls et al. |
| 7,302,485 | B2 | 11/2007 | Bauer et al. |
| 7,317,952 | B2 | 1/2008 | Bhandiwad et al. |
| 7,483,960 | B2 * | 1/2009 | Kyusojin ............... 709/219 |
| 8,423,889 | B1 | 4/2013 | Zagorie et al. |
| 2002/0023158 | A1 * | 2/2002 | Polizzi et al. ............ 709/227 |
| 2003/0009572 | A1 | 1/2003 | Thurner |
| 2003/0014440 | A1 * | 1/2003 | Bussert et al. ............ 707/513 |
| 2003/0182305 | A1 | 9/2003 | Balva et al. |
| 2003/0208587 | A1 | 11/2003 | Sauer |
| 2004/0059851 | A1 * | 3/2004 | Donaires ............... 710/104 |
| 2004/0177357 | A1 | 9/2004 | Heller et al. |
| 2004/0225491 | A1 | 11/2004 | Chang |
| 2004/0230328 | A1 | 11/2004 | Armstrong et al. |
| 2004/0230582 | A1 | 11/2004 | Pagnano et al. |
| 2004/0243933 | A1 | 12/2004 | Becker et al. |
| 2004/0249487 | A1 * | 12/2004 | Ahlert et al. ............ 700/83 |
| 2005/0071522 | A1 | 3/2005 | DeGroot |
| 2005/0086663 | A1 * | 4/2005 | Fritsch et al. ............ 719/310 |
| 2005/0120043 | A1 | 6/2005 | Lee et al. |
| 2006/0041685 | A1 * | 2/2006 | Bracewell et al. ......... 709/246 |
| 2006/0074499 | A1 | 4/2006 | Hamidpour |
| 2006/0168229 | A1 | 7/2006 | Shim et al. |
| 2007/0067725 | A1 | 3/2007 | Cahill et al. |
| 2007/0075916 | A1 | 4/2007 | Bump et al. |
| 2007/0078540 | A1 | 4/2007 | Bump et al. |
| 2007/0237141 | A1 | 10/2007 | Marchese |
| 2007/0255520 | A1 | 11/2007 | Becker et al. |
| 2007/0282463 | A1 | 12/2007 | Hodson et al. |
| 2008/0098291 | A1 * | 4/2008 | Bradley et al. ............ 715/223 |
| 2008/0112388 | A1 | 5/2008 | Garrett et al. |
| 2008/0306883 | A1 | 12/2008 | Baffier et al. |
| 2009/0005888 | A1 * | 1/2009 | Patel et al. ............ 700/44 |
| 2009/0182440 | A1 * | 7/2009 | Kassou et al. ............ 700/7 |
| 2009/0210814 | A1 * | 8/2009 | Agrusa et al. ............ 715/772 |
| 2009/0249192 | A1 | 10/2009 | Chan et al. |
| 2009/0327511 | A1 * | 12/2009 | Kim et al. ............ 709/232 |
| 2010/0281391 | A1 * | 11/2010 | Major et al. ............ 715/741 |
| 2011/0126142 | A1 | 5/2011 | Zhou et al. |
| 2011/0145687 | A1 * | 6/2011 | Grigsby et al. ............ 715/206 |

FOREIGN PATENT DOCUMENTS

| | | | | |
|---|---|---|---|---|
| EP | 1772785 | A2 * | 4/2007 | ........ G05B 19/409 |
| EP | 2091211 | | 8/2009 | |
| JP | 2004227215 | | 12/2004 | |
| JP | 2006527426 | | 11/2006 | |
| JP | 2007122697 | | 5/2007 | |
| JP | 2007536634 | | 12/2007 | |
| KR | 1020110054370 | | 5/2011 | |
| WO | 2005109122 | | 11/2005 | |

OTHER PUBLICATIONS

Software Toolbox, "Manually Controlling the Behavior of the OPC Web Client," manual, retrieved Mar. 24, 2010, www.opcwebclient.com/html/manual.html, Jun. 22, 2009, 1 page.

Software Toolbox, "How it Works," retrieved Mar. 24, 2010, www.opcwebclient.com/html/how_it_works.html, Jun. 22, 2009, 2 pages.

Intellectual Property Office, "UK Search Report", issued in connection with Great Britain Application No. GB1103406.3, Nov. 21, 2011, (3 pages).

Intellectual Property Office, Search Report, issued for European Patent Application No. GB1103391.7, on Jun. 27, 2011, (3 pages).

Unknown Author, "Why Should You Choose EDDL: Easier Calibration," EDDL, www.eddl.org, Mar. 5, 2008, 2 pages.

Rolf Birkhofer, "XML for Automotion Devices, A Multi-Schema Approach," XML Europe, May 21-25, 2001, 33 pages.

Terry Blevins, "EDDL Overview," NeSSI Meeting, EDDL, Apr. 16, 2007, 69 pages.

Martin Fowler, "Language Workbenches: The Killer-App for Domain Specific Languages?", martinfowler.com, Jun. 12, 2005, 24 pages.

Karlsruhe, "Welcome to the NAMUR EDDL Workshop with ECT," EDDL, May 22, 2006, 47 pages.

Non Final Office Action, issued by the United States Patent and Trademark Office in connection with U.S. Appl. No. 12/891,121 on Mar. 14, 2012, 16 pages.

Non Final Office Action, issued by the United States Patent and Trademark Office in connection with U.S. Appl. No. 12/891,121 on Oct. 22, 2012, 15 pages.

Final Office Action, issued by the United States Patent and Trademark Office in connection with U.S. Appl. No. 12/891,121 on Apr. 11, 2013, 17 pages.

Office Action, issued by the United States Patent and Trademark Office in connection with U.S. Appl. No. 12/891,121, on Oct. 11, 2013, 18 pages.

Final Rejection, issued by the United States Patent and Trademark Office in connection with U.S. Appl. No. 12/891,121, on Mar. 28, 2014, 21 pages.

Office Action, issued by the United States Patent and Trademark Office in connection with U.S. Appl. No. 12/891,121, on Feb. 27, 2015, 32 pages.

Notification of the First Office Action, issued by the State Intellectual Property Office of the P.R. China, in connection with Chinese Patent Application No. 201110078339.X, on Jan. 26, 2015, 15 pages.

Notification of the First Office Action, issued by the State Intellectual Property Office of the P.R. China, in connection with Chinese Patent Application No. 201110078320.5, on Feb. 4, 2015, 31 pages.

Notification of Reason(s) for Rejection, issued by the Japanese Intellectual Property Office in connection with Japanese Patent Application No. 2011-063367, on Feb. 3, 2015, 3 pages.

Notification of Reason(s) for Rejection, issued by the Japanese Intellectual Property Office in connection with Japanese Patent Application No. 2011-066415, on Feb. 10, 2015, 7 pages.

Office Action, issued by the United States Patent and Trademark Office in connection with U.S. Appl. No. 12/891,121, on Jun. 24, 2015, 29 pages.

* cited by examiner

METHODS AND APPARATUS TO ACCESS PROCESS DATA STORED ON A SERVER

FIELD OF THE DISCLOSURE

The present disclosure relates generally to process control systems and, more particularly, to methods and apparatus to access process data stored on a server.

BACKGROUND

Data systems such as control systems, manufacturing automation systems, and other industrial systems like those used in chemical, petroleum or other processes, may store data on a server to allow authorized users to access the data from any location. Typically, the data may be stored on servers that conform to the OPC. The OPC is a set of standards that define protocol based interfaces for severs used for providing access to industrial process control data, automation data, manufacturing data, and/or batch data. The OPC also defines formatting standards for the interoperability of data packaging within the servers associated with industrial processes.

Currently, clients may connect to an OPC server by creating an application that is specific to an OPC server or a type of data stored on an OPC server. For example, an application may be written as an executable program in a procedural programming language that conforms to a specific operating platform and a communication protocol of a corresponding OPC server. The application may be created by a server vendor or a client vendor that configures the application specifically for the particular OPC server. In examples where a client may need to access data stored on multiple OPC servers, a separate application may need to be created for each OPC server to conform to the specific interface requirements of the OPC servers. Further, each of these applications may need to be modified if the data stored on the corresponding OPC server is migrated to another server or if the interface requirements of the OPC server are changed.

SUMMARY

Example methods and apparatus to access process data stored on a server are described. In one example, a method includes receiving a request to access process data via a web browser, identifying a server that stores at least a portion of the process data, wherein the server is associated with an interoperability data packing format, and accessing the server to receive the process data. The example method further includes converting the process data from a format associated with the interoperability data packing format to a web browsing format, and embedding at least a first portion of the converted process data into at least one data field for display via the web browser.

An example apparatus includes an adaptor to identify a server that stores at least a portion of process data associated with a request to access the process data via a web browser, wherein the server is associated with an interoperability data packing format and access the server to receive the process data. The example apparatus further includes a converter to convert the process data from a format associated with the interoperability data packing format to a web browsing format and a web-based interface to embed at least a portion of the converted process data into at least one data field for display via the web browser.

DETAILED DESCRIPTION

Figure 1:
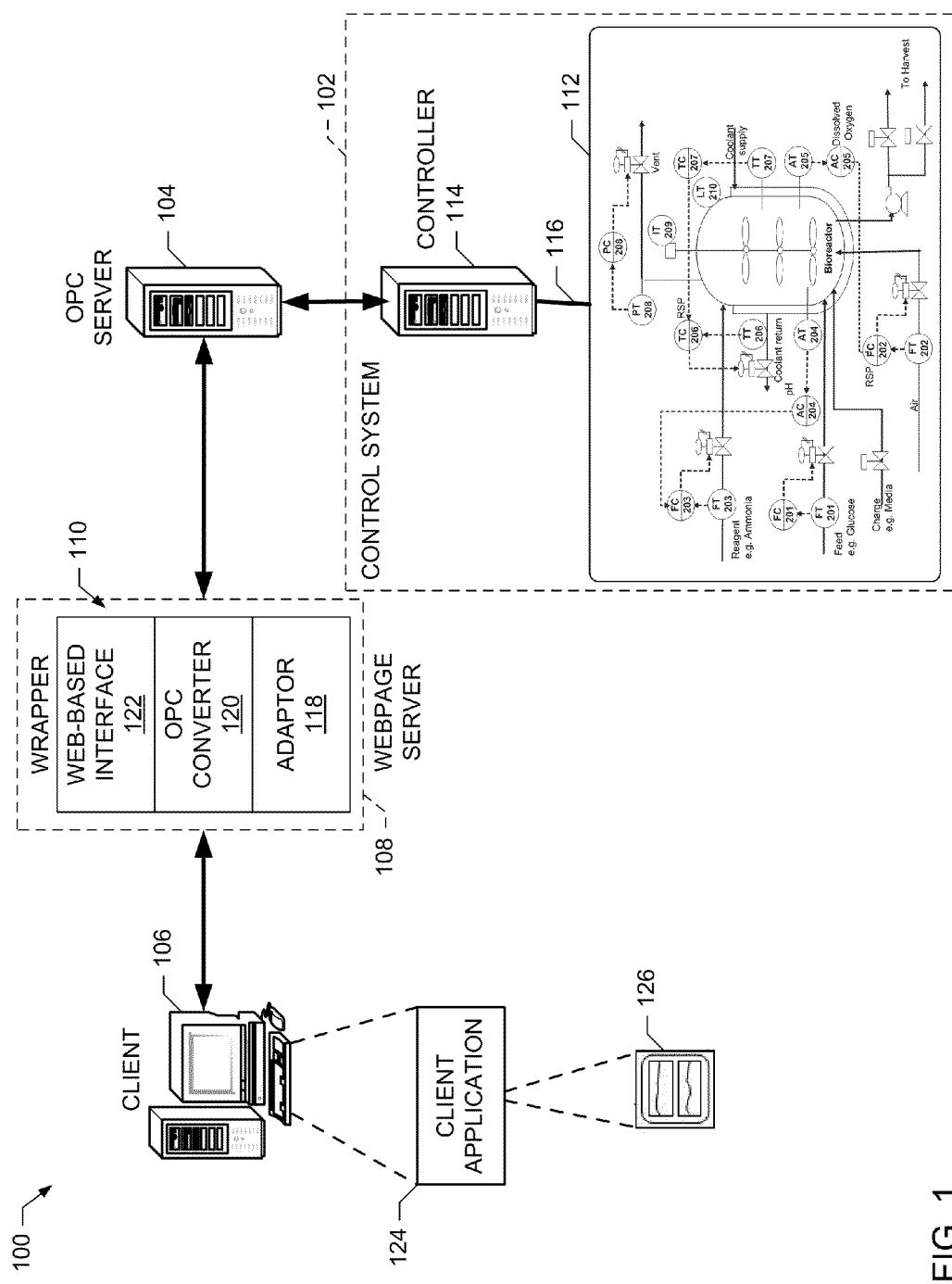
FIG. 1 is a block diagram illustrating a control environment with an example control system communicatively coupled to an OPC server that is accessible by a client via a webpage server that includes a wrapper.

Although the following describes example methods and apparatus including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus. For example, while the example methods and apparatus are described in association with and/or conforming to the OPC, the example methods and apparatus may be implanted by any other interpretability data packaging format that may be used in industrial applications, manufacturing applications, process control applications, automation applications, etc.

Currently, the OPC Foundation publishes a set of OPC specifications that define programmatic interfaces that may be used by web browsers and/or client programmatic applications to access servers that host process data. These interfaces are defined in terms of methods and/or instances that may be initiated within the servers. Further, the OPC specifications specify parameters that may be passed from OPC-related servers to requesting client applications. The OPC specifications define interfaces that may use different protocols written in procedural programming languages such as, for example, C++, Visual Basic, and/or C#.

To access these servers, clients currently create applications that are executable programs written in a procedural programming language to conform to the protocols of the OPC interfaces of these servers. The applications are created to provide access to one or more users, regardless of the location of the user, to read, write, and/or subscribe to process data and/or any other type of data that may be stored within an OPC server. The applications may be operated on any computing device (e.g., personal computer, laptop, smartphone, etc.) so that a user may access process data (e.g., objects) in any location. In other examples, the applications may be hosted within associated OPC servers as a customized webpage that accesses runtime frameworks, databases, and/or other data sources within an OPC server. An authorized user may access this application via any device capable of connecting to the Internet.

The applications may have predefined data fields that cross-reference to directory locations within an OPC server. The application may pre-format the data fields for a particular display (e.g., text fields, graphs, charts, spreadsheets, etc.) based on the type of process data (e.g., an object type). Further, the client applications may be created for a platform and/or a communication protocol specific to an OPC server. For example, the client applications are typically coded with addresses corresponding to desired OPC servers. Because of these coded features and references to directory locations within an OPC server, the client applications are typically static and may only communicate with one specific OPC server.

By having one specialized application for each OPC server and/or one application for each portion of data from an OPC server, a client (e.g., a process plant operator or engineer) may need to develop numerous applications to access data on one or more OPC servers. Additionally, if an interface to an OPC server is modified, a data directory on an OPC server is modified, and/or process data is migrated to a different OPC server, the corresponding application must be modified to reflect or accommodate the changes. Periodically having to update applications to access process data on an OPC server can result in instances where some clients may not be able to access process data. Additionally, changes to process data locations can result in broken links between an application and the process data hosted on an OPC server.

The example methods and apparatus described herein enable a client application at a client location to access any OPC server via a wrapper. The example wrapper functions as an interface between the client and an OPC server by creating data fields and/or data displays based on the process data requested by the client. In some examples, the wrapper may be included within an OPC server and accessible to a client via a web server application and/or a client display application. In other examples, the wrapper may be installed at a client site (e.g., on a computing device associated with a client and/or user). And in yet other examples, the wrapper may be included within a computing device (e.g., a server) that is communicatively coupled between a client and an OPC server.

The example wrapper may be implemented as a web server application and/or a client display application. The web server application is a framework (e.g., an ASP.NET framework application) that creates webpages with process data embedded in data fields, graphs, charts, spreadsheets, etc. that a client may access using a web browser. In the web server application example, the wrapper manages process data (e.g., objects) within a webpage. In contrast, the client display application (e.g., an ActiveX control and/or a Silverlight™ application) is a framework that can be displayed as a runtime application (e.g., a plug-in application) within a web browser. In these examples, the client display application may be installed in a computing device at the client location. The client display application may be initiated within a web browser when the web browser accesses and/or communicates with a wrapper located at the OPC server. Additionally, the client display application may configure received data and/or data field information from the wrapper such that the data is displayed within data fields, graphs, charts, spreadsheets, etc. within the web browser.

The example wrapper may include an adaptor to communicate with one or more OPC server(s). The adaptor may use Transmission Control Protocol (TCP), Hypertext Transfer Protocol (HTTP), and/or Extensible Markup Language (XML) to communicate with an OPC server to access process data requested by a client. The example wrapper also includes an OPC convertor to convert OPC formatted process data received from the OPC server to a webpage format. A webpage format may include Hyper Text Markup Language (HTML) and/or any other format for display within a client display application and/or for display within a webpage. Further, the wrapper includes a web-based interface that communicates the process data to a web browser viewable to a client via a webpage and/or a client display application.

The example wrapper may automatically create, configure, and/or format data fields for requested process data (e.g., objects) by determining one or more types of the requested process data. The types of process data may include server identification information, file directory organization information, numerical data, string data, status data of a control device, alarm data, and/or any other data that may be associated with a process control system, a manufacturing system, etc. In some examples, the wrapper may determine a data type by metadata embedded and/or associated with the process data. In other examples, the wrapper may determine a data type based on the contents of the process data. By determining the data types, the example wrapper can create appropriate data fields with the corresponding process data for display within a web browser. The data fields for displaying the data may include spreadsheets, text fields, numerical fields, graphs, charts, animations, etc. In one example, the wrapper may select Extensible Stylesheet Language Transformation (XSLT)-based templates based on a type of process data and/or a display type (e.g., a smartphone web browser or a workstation web browser) of the process control information.

By automatically creating data fields and populating (e.g., embedding) those data fields with requested process data, the example wrapper eliminates the need for a client to create request-specific applications to access data on OPC servers. Because the example wrapper dynamically formats the data fields based on data type, any changes to an OPC server and/or to process data locations within OPC servers do not affect the ability of a client to access process data. In other words, a client can access process data without having to know how an OPC server is managed, how process data is allocated within an OPC server, how process data is migrated, and/or the type of the process data. Further, because the process data may be accessed by a web browser via the wrapper, the client does not need to create an application that explicitly binds to a communication protocol, an interface protocol, and/or an operating protocol or a particular OPC server. Additionally, the example wrapper may be implemented for any OPC server regardless of protocols associated with the OPC server. Furthermore, because the example wrapper is not tied to a specific OPC server protocol, the wrapper may be installed and/or maintained more efficiently than OPC server specific applications.

FIG. 1 is a block diagram illustrating a control environment 100 with an example control system 102 communicatively coupled to an Open Packaging Convention (OPC) server 104 that is accessible by a client 106 via a webpage server 108 that includes a wrapper 110. While the webpage server 108 and/or the wrapper 110 are shown communicatively coupled to the OPC server 104 that receives process data from the control system 102, the webpage server 108 and/or the wrapper 110 may be coupled to other OPC servers that receive process data from other systems, manufacturing facilities, automation facilities, industrial systems, etc. Additionally, while the example OPC server 104 is shown as communicatively coupled to the control system 102, the OPC server 104 may be communicatively coupled to other control systems. Furthermore, the example control environment 100 may include additional clients (not shown) that may communicatively couple to the OPC server 104 via the webpage server 108 and/or other webpage servers (not shown).

The example control system 102 may include any type of manufacturing facility, process facility, automation facility, and/or any other type of process control structure or system. In some examples, the control system 102 may include multiple facilities located at different locations. Additionally, although the example control system 102 shows a process control system 112, the control system 102 may include additional process control systems.

The example process control system 112 is communicatively coupled to a controller 114 via a data bus 116. The process control system 112 may include any number of field devices (e.g., input and/or output devices). The field devices may include any type of process control component that is capable of receiving inputs, generating outputs, and/or controlling a process. For example, the field devices may include input devices such as, for example, valves, pumps, fans, heaters, coolers, and/or mixers to control a process. Additionally, the field devices may include output devices such as, for example, thermometers, pressure gauges, concentration gauges, fluid level meters, flow meters, and/or vapor sensors to measure portions of a process. The input devices may receive instructions from the controller 114 to execute a specified command and cause a change to the process. Furthermore, the output devices may measure process data, environmental data, and/or input device data and transmit the measured data to the controller 114 as process control information (e.g., process data). This process data may include the values of variables (e.g., measured process variables and/or measured quality variables) corresponding to a measured output from each field device.

In the illustrated example of FIG. 1, the example controller 114 may communicate with the field devices within the process control system 112 via the data bus 116. This data bus 116 may be coupled to communication components within the process control system 112. The communication components may include I/O cards to receive data from the field devices and convert the data into a communication medium capable of being received by the example controller 114. Additionally, these I/O cards may convert data from the controller 114 into a data format capable of being processed by the corresponding field devices. In an example, the data bus 116 may be implemented using the Fieldbus protocol or other types of wired and/or wireless communication protocols (e.g., Profibus protocol, HART protocol, etc.).

The controller 114 is communicatively coupled to the OPC server 104 via any wired and/or wireless connection. In some examples, the connection may include a firewall and/or other security mechanisms to limit access to the controller 114. The controller 114 may transmit process data to the OPC server 104 upon the controller 114 receiving the process data from the process control system 112. In other examples, the controller 114 may transmit process data to the OPC server 104 at period time intervals (e.g., every minute, hour, day, etc.). Alternatively, the OPC server 104 may request process data from the controller 114.

Upon receiving the process data, the example OPC server 104 of FIG. 1 stores the process data within a file system. The file system may be arranged in a hierarchical manner with directories and/or sub-directories based on the devices within the process control system 112 and/or based on a routine (e.g., application and/or algorithm) operating within the controller 114 to manage the process control system 112. In other examples, the file system may be arranged by an operator of the control system 102. The process data may be stored to a parameter within the associated directory and/or sub-directory. In some examples, the parameter may be a variable associated with a routine operating on the controller 114 or associated with a field device output within the process control system 112. The parameter may include metadata that describes the type of process data associated with the parameter.

Each of the directories, sub-directories, files and/or parameters may be assigned an endpoint. The OPC server 104 may also be assigned an endpoint. These endpoints may be grouped by security access, read access, subscribe access, and/or write access. An endpoint may include an address, a binding element, and/or a contract element that the wrapper 110 may use to access the process data stored in the OPC server 104. The wrapper 110 may access the process data using the endpoints as described in U.S. patent application Ser. No. 12/637,439, which is hereby incorporated by reference in its entirety.

The example wrapper 110 of FIG. 1 is included within the webpage server 108. The webpage server 108 is a device and/or an application that functions as an interface between the OPC server 104 and the client 106. In some examples, the webpage server 108 may be included as an interface within the OPC server 104. In other examples, the webpage server 108 may be installed within a computing device at the client 106. In yet other examples, the webpage server 108 may be implemented on a server or other computing device that communicatively couples the client 106 to the OPC server 104. The example wrapper 110 within the webpage server 108 receives requests from the client 106 to access process data (e.g., objects), requests the process data from the OPC server 104, converts the process data into a format viewable by the client, and creates and/or formats data fields to embed the process data for display within a web browser. The example wrapper 110 may also include security features such as, for example, user authentication and/or encryption to ensure only authorized users may view and/or access the process data.

To access the OPC server 104, the example wrapper 110 includes an adaptor 118. The example adaptor 118 may use TCP, HTTP, and/or XML-based communications to communicate with the OPC 104 server via any wired and/or wireless connection. The wrapper 110 further includes an OPC converter 120 to convert the process data received by the adaptor 120 into a format (e.g., XSLT-based templates) that is viewable via a web browser. The example wrapper 110 also includes a web-based interface 122 to provide an interface to the client 106 for formatting, rendering, embedding and/or displaying the process data.

The example client 106 may be associated with an individual that may be authorized to read, write, and/or subscribe to process data stored on the OPC server 104. The client 106 may also be associated with personnel associated with the control system 102 that may access the OPC server 104 from a remote location. The client 106 may access the OPC server 104 via the webpage server 108 using any wired and/or wireless communication medium (e.g., the Internet).

In an example where the client 106 generates a request to access process data (e.g., objects), the wrapper 110 receives a request message from the client 106. In particular, the web-based interface 122 may receive the request. Upon receiving the request, the web-based interface 122 forwards the request to the adaptor 118. The adaptor 118 uses information within the request (e.g., a Uniform Resource Locator (URL) destination address) to identify an OPC server (e.g., the OPC server 104) that stores the requested process data. The adaptor 118 then accesses the OPC server 104 to retrieve the process data. The process data may be stored within the OPC server 104 according to an interoperability data packing format that corresponds to the OPC. The adaptor 118 may use endpoints associated with the process data to access and/or read the process data. The adaptor 118 then forwards the process data received from the OPC server 104 to the OPC convertor 120, which converts the process data from a format associated with the interoperability data packing format to a web browsing format. The OPC convertor 120 then forwards the converted process data to the web-based interface 122. The web-based interface 122 then embeds and/or places at least a portion of the converted process data into one or more corresponding data fields (or templates) for display via a web browser in a webpage viewable by the client 106.

The web-based interface 122 may embed the process data into one or more data fields by partitioning the converted process data by a data type associated with the process data, determining which data type is associated with a data field, creating a data field for each data type, and placing the data associated with each data type into the associated data field. The web-based interface 122 may determine a data type from the process data by determining metadata associated with each portion of the process data and cross-referencing the metadata to the associated data field.

The example web-based interface 122 is capable of formatting the process data such that the process data is viewable by the client 106 using a client application 124. The example of FIG. 1 shows the client application 124 displaying process data in an interface 126 that may involve a web browser. The client application 124 may include a web server application and/or a client display application. The wrapper 110 may format process data for a web server application by creating a webpage and/or accessing a template webpage and placing or embedding the data fields within the webpage. The interface 126, via a web browser, may then display the process data by accessing the webpage hosted in the wrapper 110 and/or the web page server 108 using html requests and responses. Alternatively, the wrapper 110 may format the process data for a client display application by initializing a web application (e.g., ActiveX, Adobe Flash™ and/or Silverlight™) at the client application 124 that is executable within a web browser (e.g., the interface 126). In some examples, the client 106 may download and/or install the client display application prior to viewing the process data. The wrapper 110 transmits the process data and/or the data fields to the client display application. In some examples, the wrapper 110 associates the process data with the corresponding data fields prior to transmitting the process data to the client display application. Upon receiving the process data, the client display application creates (e.g., renders) a display within the web browser (e.g., the interface 126) to view the process data within the corresponding data fields.

Furthermore, the client 106 may customize the client application 124 by modifying data fields and/or displaying of the process data within the web browser. For example, the client 106 may specify a location within the web browser to display a data field. Further, the client 106 may modify the color, text size, numerical convention, and/or any other graphical representation of the process data with the data fields.

The client 106 may access the OPC server 104 to read, write, and/or subscribe to process data. Subscribing to process data may include receiving authorization from the example wrapper 110 and/or the OPC server 104 to receive periodic and/or continuous updates of requested process data as the process data is transmitted by the controller 114. Reading the process data may include reading the current value of the process data stored in the OPC server 104. Writing the process data may include receiving values from the client 106 to modify or change a parameter stored as process data within the OPC server 104. Writing data may also include modifying a status, an alarm and/or a flag associated with the process data. Upon receiving a written value, the example OPC server 104 may transmit the written value to the controller 114 to change and/or modify an operation of the process control system 112. To enable the client 106 access to the process data, the example wrapper 110 may implement security features including encryption, authentication, integrity codes, and/or user specific access control lists. In examples where a user and/or the client 106 is not authorized to access process data, the example wrapper 110 may provide only read access to the process data or, alternatively, may not provide any access to the process data.

Figure 2:
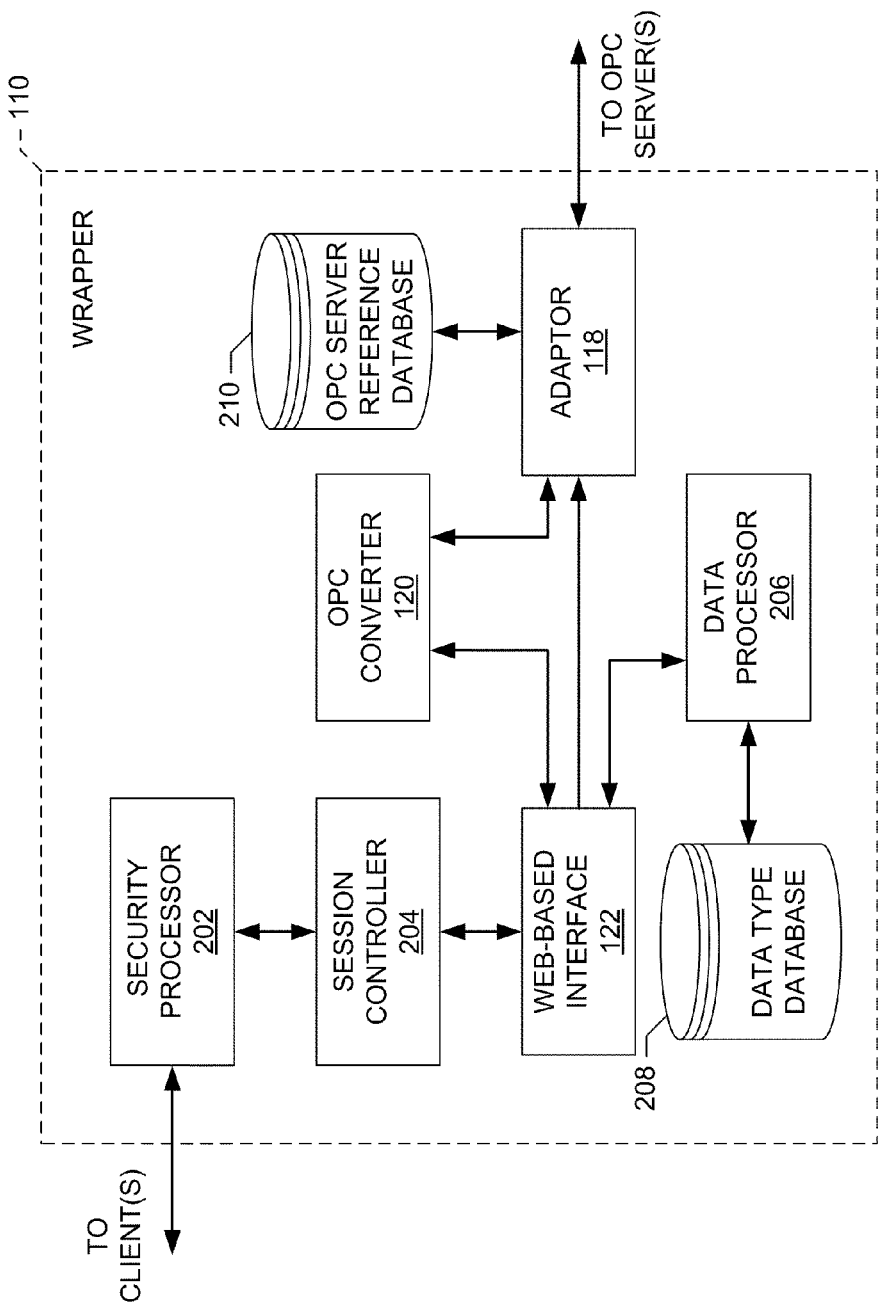
FIG. 2 is a functional diagram of the example wrapper of FIG. 1.

FIG. 2 is a functional block diagram of the example wrapper 110 of FIG. 1. The wrapper 110 includes the adaptor 118, the OPC converter 120, and the web-based interface 122 of FIG. 1. Each of the functional blocks within the wrapper 110 of FIG. 2 may facilitate multiple clients and/or OPC servers or, alternatively, the wrapper 110 may include functional blocks for each communicatively coupled OPC server and/or functional blocks for each client (e.g., the client 106).

To provide security measures such as encryption and/or endpoint access controls for communications with the client 106 and/or the client application 124, the example wrapper 110 of FIG. 2 includes a security processor 202. The example security processor 202 may include, for example, encryption processors and/or digital signature generators to protect outgoing communications from unauthorized third parties. The encryption processors may use any type of encryption encoders to format communications destined for the client application 124 in a format unreadable to unauthorized users. The digital signature generators protect communications for the client application 124 from being tampered with by unauthorized third parties. The digital signature generators may use any type of cryptographically secure signature generator (e.g., hash codes) that enables the detection of values that have been modified by an unauthorized third party between the client application 124 and the wrapper 110. Additionally, the security processor 202 may include other forms of communication security including authentication mechanisms and/or access controls. The example security processor 202 may decode encrypted, and/or signed communications originating from the client application 124 and/or the client 106. Upon decoding the communications, the security processor 202 transmits the communications to the intended destination within the wrapper 110.

In the example of FIG. 2, the security processor 202 is communicatively coupled to one or more clients including the client 106. The security processor 202 may filter request messages originating from clients and/or other individuals by identification information so that only authorized clients may access the process data within a desired OPC server. Further, the security processor 202 may forward process data and/or data fields to a client display application implemented within the client application 124. In other examples, the security processor 202 enables secure communications between the client 106 and the web-based interface 122 that may host a webpage displaying process data.

To manage data communications between one or more client(s) and the example web-based interface 122, the example wrapper 110 of FIG. 2 includes a session controller 204. The example session controller 204 manages an access session for client (e.g., the client 106 of FIG. 1) that communicates with the wrapper 110. The access session represents an open communication path between the web-based interface 122 and a client. An access session may be created for each client that accesses the web-based interface 122 because each client may request access to different data sources and/or data types from different OPC servers. Thus, the example session controller 204 ensures that the web-based interface 122 provides a client with only the process data requested by the client.

The session controller 204 initiates a session after receiving a request message to access process data from a client. The request may be in the form of a request via a web browser and/or via the client application 124. Until a session is opened by the session controller 204, the session controller 204 may reject any other request from a client. While the session is open, the session controller 204 routes each request message from a client to the web-based interface 122. Additionally, the session controller 204 may store references to selected process data and their associated read or write endpoints that may be associated with data fields and/or process data viewable in a webpage.

The example web-based interface 122 included within the wrapper 110 of FIG. 2 provides an interface to clients by managing, formatting, and/or configuring process data. The web-based interface 122 receives process data (e.g., objects) in a format that is viewable in a web browser from the OPC converter 120. The example web-based interface 122 also processes requests from clients to access process data. Upon receiving a request from a client, the web-based interface 122 initiates an access session by sending an instruction to the session controller 204 and forwarding the request to the adaptor 118. In some examples, the web-based interface 122 receives the request after the security processer 202 determines that the request is associated with an authenticated client. Additionally, the web-based interface 122 may close an access session when a client closes and/or terminates a web browser and/or when a client application sends an instruction to terminate the session.

When the web-based interface 122 receives process data associated with a request, the web-based interface 122 determines one or more data type(s) associated with the process data by forwarding the process data to a data processor 206. The example data processor 206 identifies metadata that may be included within portions of the process data. Alternatively, the data processor 206 accesses a data type database 208 to cross-reference process data to a corresponding data field based on a value type, property, variable type, and/or any other identifier that may be associated with process data. The example data type database 208 may be implemented by Electronically Erasable Programmable Read-Only Memory (EEPROM), Random Access Memory (RAM), Read-Only Memory (ROM), and/or any other type of memory.

The example data processor 206 of FIG. 2 associates and/or configures process data with a data field by, upon determining data type(s) associated with the process data, assigning the process data to one or more data display variables of a data field that may be cross-referenced to a data type. The data processor 206 and/or the web-based interface may also store the numerical, alphanumeric, and/or flag values of the process data to the appropriate data field.

Further, the data processor 206 may access the data type database 208 for a template to display the process data. The template may include a XSLT template that converts XML information (e.g., process data) into HTML for display within a web browser. The data processor 206 may select a template based on a type of the process data, values of the process data, properties of the process data, and/or target display information. Target display information may identify a type of web browser and/or a device that is to display the process data. For example, target display information may indicate if process data is to be displayed on a smartphone web browser or a web browser on a workstation. A template for a smartphone may be configured to display process data on a relatively small screen compared to a template for a workstation web browser.

The web-based interface 122 receives the data type(s) of the process data from the data processor 206 and compiles the data fields with the process data. The web-based interface 122 may then embed and/or place the process data (e.g., the compiled portions of the process data associated with the respective data fields) into the appropriate data fields of a template. The web-based interface 122 embeds the portions of the process data into the data field(s) by partitioning the process data by the data type(s), using the information and/or template(s) from the data processor 206 to determine which data type is associated with a data field, creating a data field for each data type, and placing the process data associated with each data type into the associated data field. In some examples, a data field may be associated with more than one data type. The web-based interface 122 may then embed the process data in a webpage that includes the data field(s).

In examples where a client may request process data using a client application (e.g., the client application 124), the example web-based interface 122 determines the type of application. The web-based interface 122 may determine the type of client application by identifying a protocol and/or application language associated with the request message and/or any metadata associated with the client application within the request message. For example, a client that uses a web server application may include protocols associated with the ASP.NET application, while a client that uses a client display application may include protocols and/or messages associated with a Silverlight™ or an ActiveX application. Based on the type of client application, the example web-based interface 122 creates and/or configures the appropriate web browser and/or programmatic interface to display the process data within the data field(s).

Upon determining a client application type, the web-based interface 122 and/or the data processor 206 formats the process data, and/or data fields for display. In examples where the client application 124 is associated with a web server application, the web-based interface 122 receives a request from the client 106 via a web browser, forwards the request to the adaptor 118 to access the process data, and receives the process data from the OPC converter 120. The request from the client 106 via the web browser may be in the form of an HTML document. Further, the web-based interface 122 may send an instruction to the session controller 204 to associate the web browser of the client 106 with the newly created access session. The web-based interface 122 then creates a webpage with the data fields that include the process data. The data fields may include, for example, lists, spreadsheets, graphs, charts, graphical indications, animations, etc. Further, the locations of the data fields may be specified by a template. The web-based interface 122 then transmits the contents of the webpage to the web browser of the client 106 to display the webpage at the client location. The process data within the webpage is transmitted by the web browser to the client 106 in a formatted context via any HTTP, XML, XSLT, and/or any other Internet webpage transmission format.

In examples where the web browser includes a client display application, the example web-based interface 122 receives a request from the client 106 via a web browser, forwards the request to the adaptor 118 to access the process data, receives the process data from the OPC converter 120, and initiates the client display application within the web browser. The request from the client 106 via the web browser may be in the form of a method call. Upon formatting and/or configuring the process data, the web-based interface 122 transmits the process data to a client in a format associated with protocols of the client display application. The client display application then creates a display in the web browser at the client location showing the process data within the associated data fields.

The client display application may include any programmatic client that, in some examples, may access the web-based interface 122 without a web browser. In these examples, the web-based interface 122 associates the programmatic client with the newly created access session and forwards request process data and/or data fields to the client via any protocols associated with the programmatic client. The programmatic client then creates a display that shows the process data within the associated data fields.

The example web-based interface 122 provides clients with read access, write access, and/or subscribe access. For clients that request read access, the web-based interface 122 forwards a single request to the adaptor 118 for current process data. Upon receiving and formatting the process data, the web-based interface 122 provides the client application(s) with the requested process data.

Alternatively, when clients request subscribe access, the web-based interface 122 may send periodic messages to the adaptor 118 to receive process data at time intervals. In some examples, the client may specify the time intervals to receive process data. Further, after the web-based interface 122 creates the webpage and/or the display configuration for a programmatic application, the web-based interface 122 provides periodic and/or continuous updates to the data fields with more recent process data. The web-based interface 122 provides the updates via an already active access session that maintains communication with a requesting client. The updates to the data fields may include updating trend graphs, process status alerts, and/or flags with the most recent process data stored to corresponding OPC server. Thus, the web-based interface 122 enables a client to access the most recent process data without having to refresh a web browser and/or without having to periodically request the process data.

In yet other examples where clients may request write access, the example web-based interface 122 receives the written process data value from the webpage and/or programmatic application via an HTML document or a method request. The web-based interface 122 then identifies a variable associated with the written data value. In other examples, the web-based interface 122 may access the data processor 206 to cross-reference the data value to a data type specified within the data type database 208. The web-based interface 122 then sends an instruction to the OPC converter 120 and/or the adaptor 118 to forward the data value to the appropriate variable and/or portion of the OPC server. The OPC server may then store the written data value and/or forward the written data value to the appropriate location within a controller.

The example web-based interface 122 may store client customization information to a database (not shown) so that the next time the same client requests the same type of process data, the web-based interface 122 may format the process data within data field(s) based partly on the prior customization of the client. The web-based interface 122 may identify client customization by any modifications performed by a client through a web browser and/or a programmatic application to alter the appearance and/or data display of the process data within the data field(s). A client may modify a color, a text size, a numerical convention, and/or any other graphical representation of the process data.

To access OPC servers (e.g., the OPC server 104), the example wrapper 110 of FIG. 2 includes the adaptor 118. The example adaptor 118 may use TCP, HTTP, XML, and/or any other transmission protocol to communicate with the OPC server(s) via any wired and/or wireless connection. The adaptor 118 receives requests to access an OPC server from the web-based interface 122. Upon receiving a request, the adaptor 118 identifies an OPC server that stores process data by accessing an OPC server reference database 210 to cross-reference a client request to a particular OPC server. The example OPC server reference database 210 may be implemented by EEPROM, RAM, ROM, and/or any other type of memory.

In some examples, the client request may include a web address and/or an identifier of an OPC server. The adaptor 118 may reference the OPC server reference database 210 to determine a location of the requested OPC server. In some examples, the adaptor 118 may access two or more OPC servers to access requested process data. Upon determining the location of the OPC server, the adaptor 118 sends a request to the OPC server for the process data. The adaptor 118 may access the process data on the OPC server by determining a directory and/or file structure of the OPC data stored on the server. The adaptor 118 may relay this directory and/or file structure to the web-based interface 122 to enable a client to select one or more directories and/or sub-directories via a web browser and/or programmatic application. By selecting the directories and/or sub-directories, the client specifies the process data desired to be viewed and/or accessed. In other examples, the client may include the directory and/or sub-directory location of the desired process data. In yet other example, the client may specify variable names, process data identifiers, and/or any other data identification information that the adaptor 118 may use to navigate through an OPC server to access the requested process data.

The example adaptor 118 may navigate through the directories, sub-directories, and/or files of an OPC server using assigned endpoints. For example, the adaptor 118 may access the OPC server reference database 210 to identify an endpoint corresponding to an OPC server. The OPC server may then return endpoints to the adaptor 118 associated with process data based on a hierarchy, read access, write access, and/or subscribe access. The adaptor 118 may then determine which endpoint(s) are associated with the requested process data and uses the endpoint(s) to browse and/or locate the locations within the OPC server that store the process data.

In examples where the adaptor 118 receives a read and/or a subscribe instruction from the web-based interface 122, the adaptor 118 may access corresponding read and/or subscribe endpoints associated with the requested process data. Further, in examples where a client may specify a periodic interval to receive process data (e.g., subscribing to process data), the adaptor 118 may poll the OPC server at the periodic interval for desired process data.

In yet other examples where a client may write a process data value to a data field, the adaptor 118 receives the value and/or the associated value identifier from the web-based interface 122. The adaptor 118 then navigates through the OPC server (e.g., using write endpoints) to locate the file and/or directory location associated with the written data value. The adaptor 118 then stores the written value to the appropriate location within the OPC server. In some examples where a client may write a value, the adaptor 118 may receive the value after the OPC converter 120 converts the value from a webpage and/or programmatic application format to an OPC format.

The example adaptor 118 of FIG. 2 includes functionality that enables the adaptor 118 to interface and/or communicate with different OPC servers that may be operating with different protocols, interfaces, operating systems, and/or file systems. The OPC server reference database 210 may include references to the protocols, interfaces, operating systems, and/or file systems associated with each OPC server. Then, when the adaptor 118 identifies an OPC server to access, the adaptor 118 may use the protocol, interface, operating system, and/or file system information associated with the OPC server to appropriately communicate and/or interface with the OPC server.

Upon receiving and/or accessing the requested process data from an OPC server, the example adaptor 118 forwards the process data to the OPC converter 120. The example OPC converter 120 of FIG. 2 converts process data from any OPC and/or packaging-related format to a format that is viewable within a web browser and/or any other programmatic application. Upon converting the process data to a web browsing format and/or any other programmatic application format, the OPC converter 120 forwards the converted process data to the web-based interface 122. Further, the OPC converter 120 may receive written values and/or process data from the web-based interface 122. In these examples, the OPC converter 120 converts the web browsing and/or programmatic application format of the written data into an OPC format that the adaptor 118 may use to store the written data to an OPC server. The OPC converter 120 may use any application, framework, data conversion algorithm, etc. that may be specified by the OPC and/or any other data packaging convention.

While an example manner of implementing the wrapper 110 is depicted in FIG. 2, one or more of the interfaces, data structures, elements, processes and/or devices illustrated in FIG. 2 may be combined, divided, rearranged, omitted, eliminated and/or implemented in any other way. For example, the example security processor 202, the example session controller 204, the example web-based interface 122, the example data processor 206, the example data type database 208, the example OPC converter 120, the example adaptor 118, and/or the example OPC server reference database 210 illustrated in FIG. 2 may be implemented separately and/or in any combination using, for example, machine-accessible or readable instructions executed by one or more computing devices and/or computing platforms (e.g., the example processing platform P10 of FIG. 11).

Further, the example security processor 202, the example session controller 204, the example web-based interface 122, the example data processor 206, the example data type database 208, the example OPC converter 120, the example adaptor 118, the example OPC server reference database 210 and/or, more generally, the wrapper 110 may be implemented by hardware, software, firmware and/or any combination of hardware, software and/or firmware. Thus, for example, any of the example security processor 202, the example session controller 204, the example web-based interface 122, the example data processor 206, the example data type database 208, the example OPC converter 120, the example adaptor 118, the example OPC server reference database 210 and/or, more generally, the wrapper 110 can be implemented by one or more circuit(s), programmable processor(s), application specific integrated circuit(s) (ASIC(s)), programmable logic device(s) (PLD(s)) and/or field programmable logic device(s) (FPLD(s)), etc. Further, the example wrapper 110 of FIG. 2 may include one or more elements, processes and/or devices in addition to, or instead of, those illustrated in FIG. 2, and/or may include more than one of any or all of the illustrated elements, processes and devices.

Figure 3:
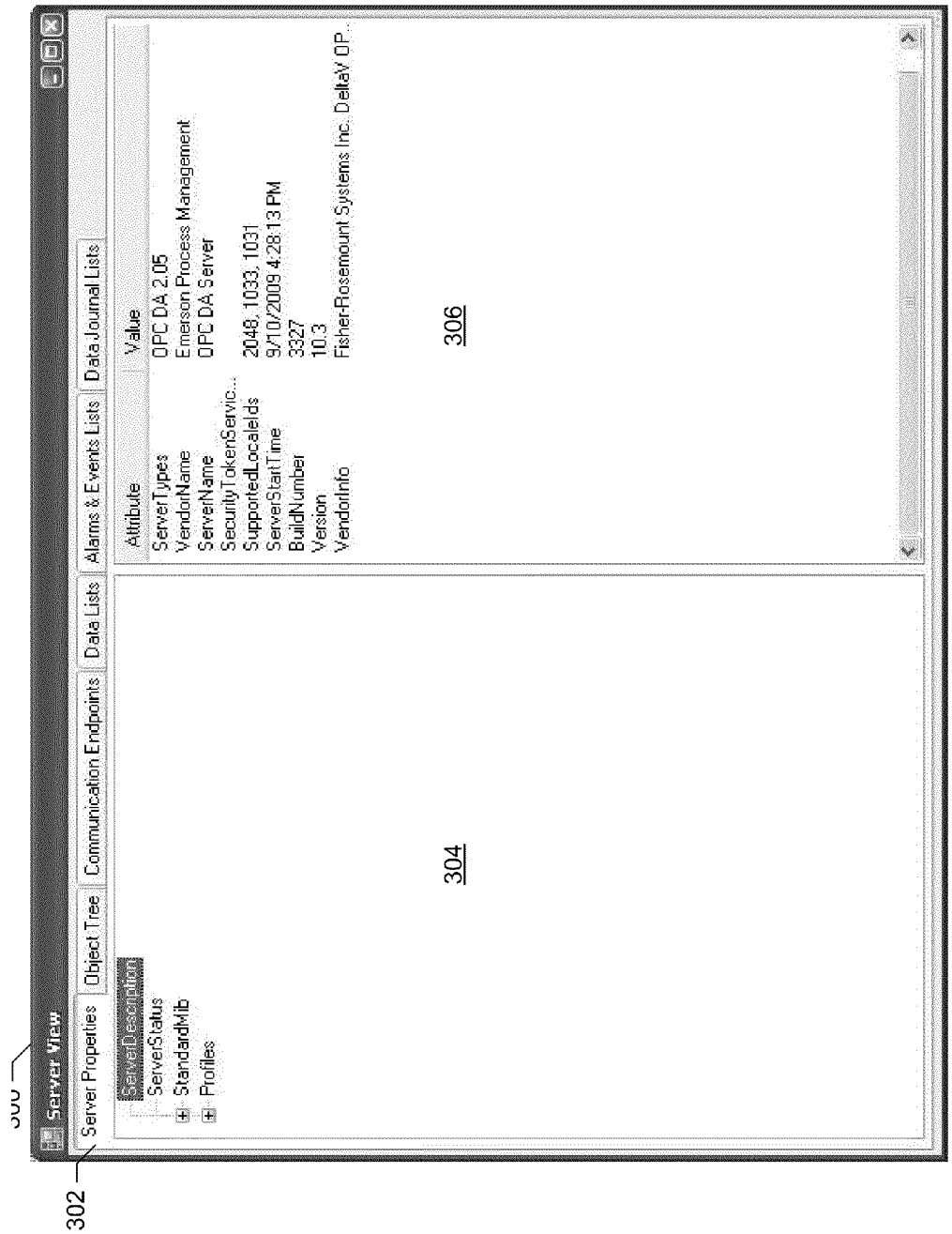
FIG. 3 shows an example interface for server identification process data displayed in a web browser.

FIG. 3 shows an example interface 300 for server identification process data displayed in a web browser. The interface 300 may be referred to as a style sheet and/or template. The interface 300 is shown as an application window. However, in other examples, the interface 300 may include navigation functions associated with a web browser and/or any other programmatic client. Further, while the example interface 300 is shown as one way of displaying process data in data fields, other example interfaces may be created to display process data.

The example of FIG. 3 shows the interface 300 displaying server identification information associated with a Server Properties tab 302. The interface 300 includes a navigation panel 304 and a data panel 306. The panels 304 and 306 may be preconfigured as a general template for displaying process data. The example wrapper 110 of FIGS. 1 and/or 2 may then use the template or style sheet for arranging and/or embedding data field(s) and the associated process data. For example, the data panel 306 may be preconfigured to display a variable and/or parameter name (e.g., Attribute), and a data value (e.g., Value) associated with process data. Then, the wrapper 110 may embed and/or place the data fields associated with the service identification into the Attribute column and/or the Value column. For example, process data describing the OPC server name may be identified as a "Server-Name" Attribute with a Value of "OPC DA Server."

A client may access the process data shown in the interface 300 by entering a web address and/or an Internet Protocol (IP) address into a web browser. The web browser may then navigate to the wrapper 110 and/or the webpage server 108 of FIG. 1. The wrapper 110 resolves the web address and/or the IP address to the OPC server shown in the interface 300. The wrapper 110 may then retrieve the process data associated with the OPC server, convert the process data into a web browsing format, identify data type(s) of the process data, select a template associated with the interface 300, embed the process data into the interface 300 and display the interface 300 to the client via the web browser. In this example, the wrapper 110 determines the type(s) of process data by identifying the attribute metadata that is associated with the data values. The wrapper 110 may then create a list of the data values corresponding to the attribute name.

The example navigation panel 304 shows a directory and/or file structure of OPC server identification information associated with the OPC server. A client may navigate through the directory structure in the navigation panel 304 to select process data associated with OPC server information that is displayed within the data panel 306. The client may selectively view other OPC server data by selecting the other directories within the navigation panel 304. The example wrapper 110 may retrieve this directory structure (e.g., process data) from the OPC server and configure the directory structure within data fields using the template of the navigation panel 304.

Figure 4:
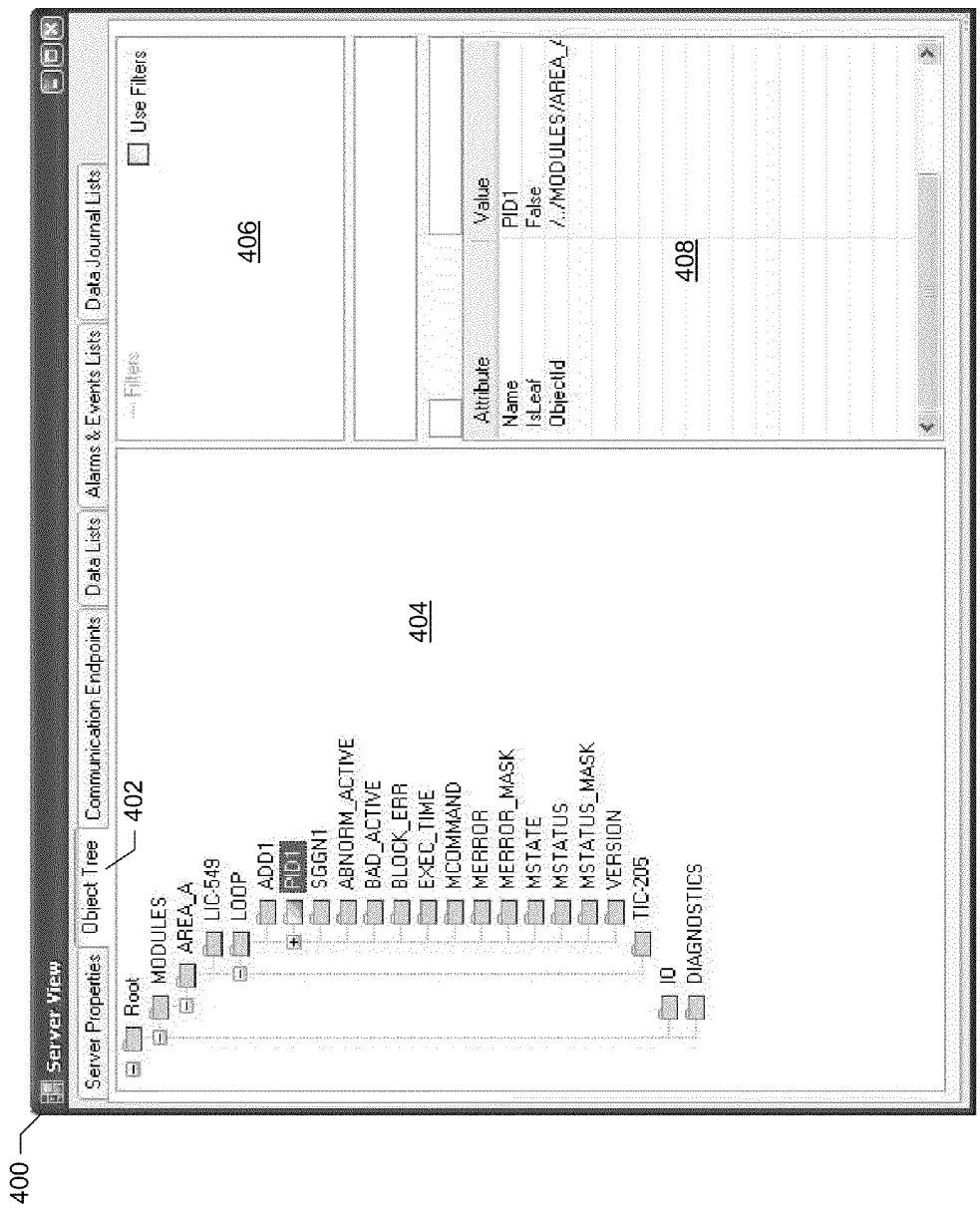
FIG. 4 shows an example interface for a server hierarchical directory displayed in a web browser.

FIG. 4 shows an example interface 400 (e.g., style sheet) for a server hierarchical directory displayed in a web browser. The hierarchical directory is shown by selecting the Object Tree tab 402 and may represent a data structure of process data stored on an OPC server. The example wrapper 110 of FIGS. 1 and/or 2 retrieves the hierarchical directory structure stored in the OPC server, converts the data into a web browsing format, and determines the data type(s) associated with a data structure. The wrapper 110 then configures, organizes, and places the hierarchical directory into data fields within a navigation panel 404. A client may navigate through the directories in the navigation panel 404 to select a directory and/or subdirectory that includes desired process data. The hierarchical directory may be organized to reflect a structure of devices within a control system and/or a structure of a control routine operated by a controller. The example wrapper 110 may use endpoint addresses to navigate through the directory structure and to provide the hierarchical directory to the client in a web browser.

The example interface 400 further includes a filter panel 406 to filter any directories based on input provided by a client. The interface 400 also includes a data panel 408 that shows data fields including variable and/or parameter names (e.g., Attribute) and a corresponding process data value (e.g., Value) for a selected directory. In the example of FIG. 4, the client selects the PID1 directory. Accordingly, the wrapper 110 retrieves the process data associated with the PID1 directory and embeds the process data for display in the data panel 408 by the web browser.

Figure 5:
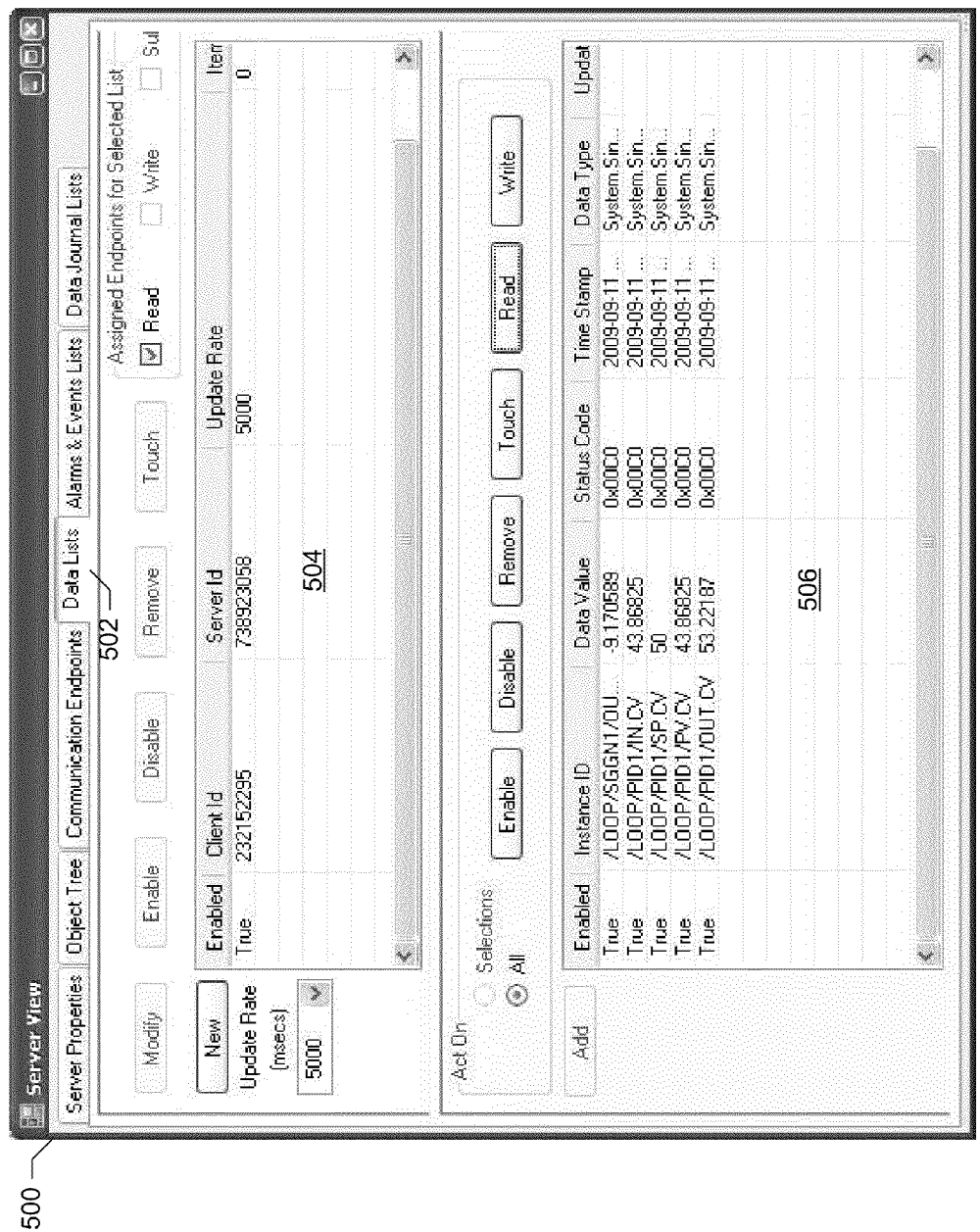
FIG. 5 shows an example interface for process data displayed in a web browser.

FIG. 5 shows an example interface 500 for process data displayed in a web browser. The process data is shown in the web browser by selecting a Data Lists tab 502. Upon a client selecting the Data Lists tab 502, the example wrapper 110 of FIGS. 1 and/or 2 retrieves process data. The interface 500 include a subscribe panel 504 and a data panel 506. The layout of the panels 504 and/or 506 may be preconfigured based on the type of process data that may be retrieved within the Data Lists tab 502.

The subscribe panel 504 enables a client to specify a refresh rate for process data displayed in the data panel 506. In this example, the client specifies a 5000 millisecond (msec) update rate. The subscribe panel 504 also includes a client identifier (e.g., Client Id), a OPC server identifier (Server Id), and the selected refresh rate (e.g., Update rate).

The example data panel 506 shows selected process data including a directory location of the process data within the OPC server (E.g., Instance ID), a data value (e.g., Data Value), a status of the process data (e.g., Status Code), and a time the process data was created (e.g., Time Stamp). The data panel 506 includes buttons to add or remove process data from display. The data panel 506 also includes buttons to read or write the process data.

In the example of FIG. 5, the wrapper 110 determines that the process data to be displayed is associated with a data type that may be displayed as values in a spreadsheet. In other examples, the process data may be displayed within a graph, a chart, an animation, a graphical indicator, etc. For example, the data panel 506 within the interface 500 may be preconfigured such that if some process data is associated with a graphical display, the wrapper 110 may invoke a preconfigured graphical display to show the process data within the appropriate data fields.

Figure 6:
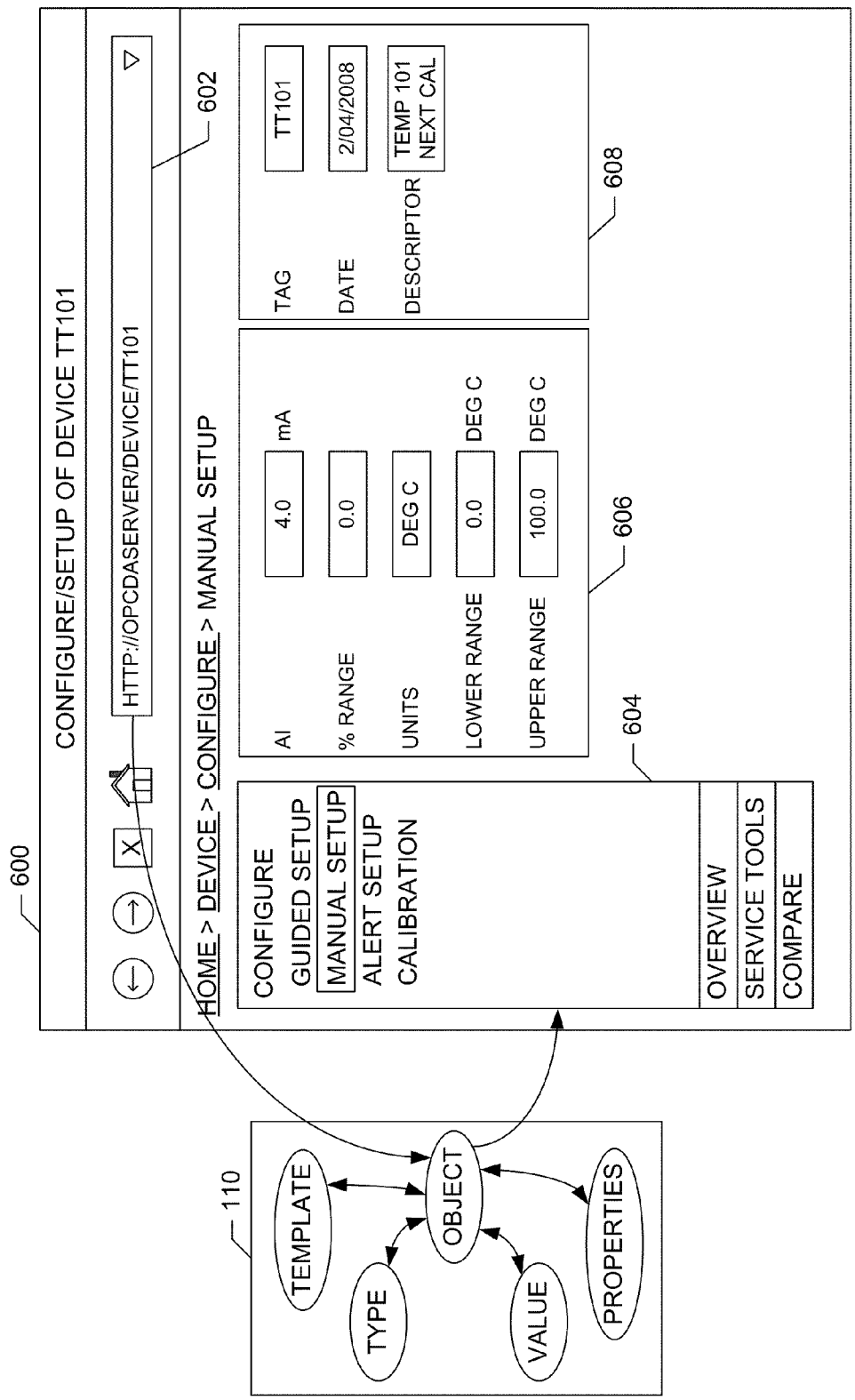
FIG. 6 shows an example interface communicating with the example wrapper of FIGS. 1 and/or 2 to display process data in a web browser.

FIG. 6 shows an example interface 600 communicating with the example wrapper 110 to display process data in a web browser. The example interface 600 includes a navigation bar 602 that an operator may use to enter a field device name to view process data associated with the field device. In another example, a user may use a hierarchical directory similar to the directory described in conjunction with FIG. 4 to locate a field device. The interface 600 also includes a menu bar 604 that includes options for interfacing with the TT101 field device. In this example, a Manual Setup option is selected.

The example interface 600 of FIG. 6 may provide the wrapper 110 target display information that indicates process data associated with the TT101 field device is to be displayed within a web browser on a workstation or laptop. Additionally, upon selecting or entering a field device (e.g., object), the example wrapper 110 receives the field device name (e.g., TT101). The wrapper 110 uses the field device identifier to identify a type of field device (e.g., an object type), properties associated with the field device, and/or process data (e.g., values) associated with the field device. The wrapper 110 uses this information with the target display information to select a template to display the process data within data fields. The wrapper 110 also uses this information to access the process data from an OPC server. The wrapper 110 may select a template by accessing the data type database 208 and locating templates for web browsers operating on a workstation. The wrapper 110 may then narrow the templates based on a device type of the TT101 field device. The wrapper 110 may then select the data field(s) within the template that corresponds to the process data.

In the example of FIG. 6, the wrapper 110 may provide the interface 600 with a template 606 and a template 608. The templates 606 and 608 include data fields with process data (e.g., analog input (AI), % Range, Units, Lower Range, Upper Rage, Tag, Date, and Descriptor) associated with the TT101 field device. The example wrapper 110 may render the process data shown in the templates 606 and 608 by matching and inserting the process data into the appropriate data field(s) based on metadata within the process data. In other examples, templates may include graphs, charts, graphics, and/or any other data representation.

Figures 7A, 7B:
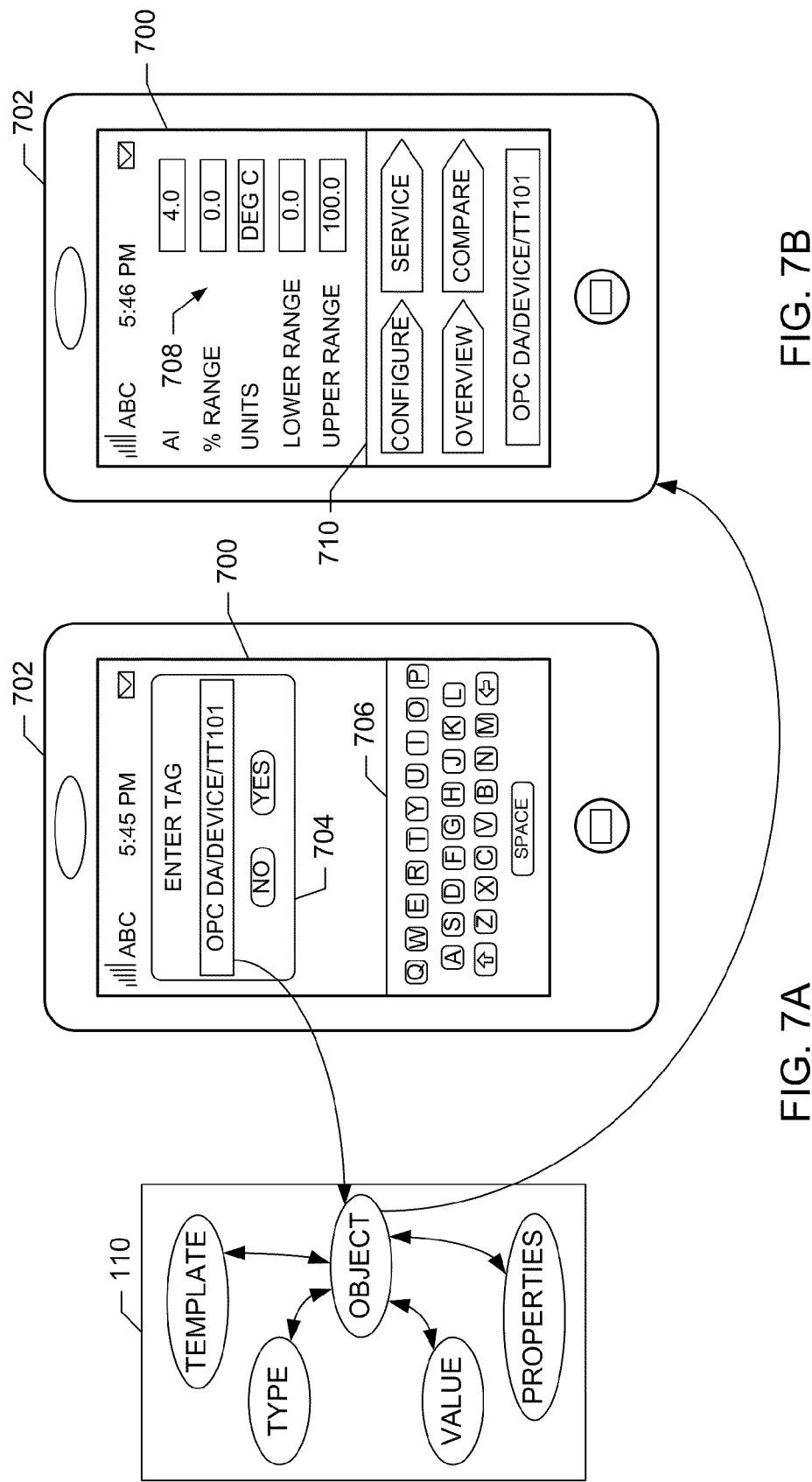
FIGS. 7A and 7B show an example interface displayed on a wireless device communicating with the example wrapper FIGS. 1 and/or 2 to display process data in a client application.

FIGS. 7A and 7B show an example interface 700 displayed on a wireless device 702 communicating with the example wrapper 110 of FIGS. 1 and/or 2 to display process data in a client application. The wireless device 702 may include any portable computing device including, for example, a smartphone, a personal digital assistant (PDA), a web phone, etc. The examples of FIGS. 7A and 7B show the example wrapper 110 rendering process data in a template configured for the wireless device 702.

In FIG. 7A, the user interface 700 includes an object search field 704 and a keyboard 706. The object search 704 enables a user to enter a field device identifier (e.g., OPC DA/DEVICE/TT101) via the keyboard 706. The object search field 704 provides the entered TT101 field device to the wrapper 110. Additionally, the wireless device 702 may send the target display information to the wrapper 100. The wrapper 110 uses the TT101 field device identifier to locate process data and/or properties associated with the TT101 field device. Also, the example wrapper 110 uses the target display information to select a template 708 formatted for display on the relatively small screen of the wireless device 702.

The wrapper 110 may match, insert, and render the process data in the corresponding data fields of the template 708, as shown in FIG. 7B. Additionally, the wrapper 110 may display a menu bar 710 for navigating to different templates. The menu bar 710 may be included within the template 708 and/or may be specified by navigational process data associated with the OPC DA/DEVICE/TT101 directory location. Alternatively, the display of the menu bar 710 may be managed by the client application. The example of FIG. 7B shows that the wrapper 110 selects the template 708 formatted for the wireless device 702, while in FIG. 6 the wrapper 110 selects the templates 606 and 608 formatted for the web browser on a workstation.

Figure 8:
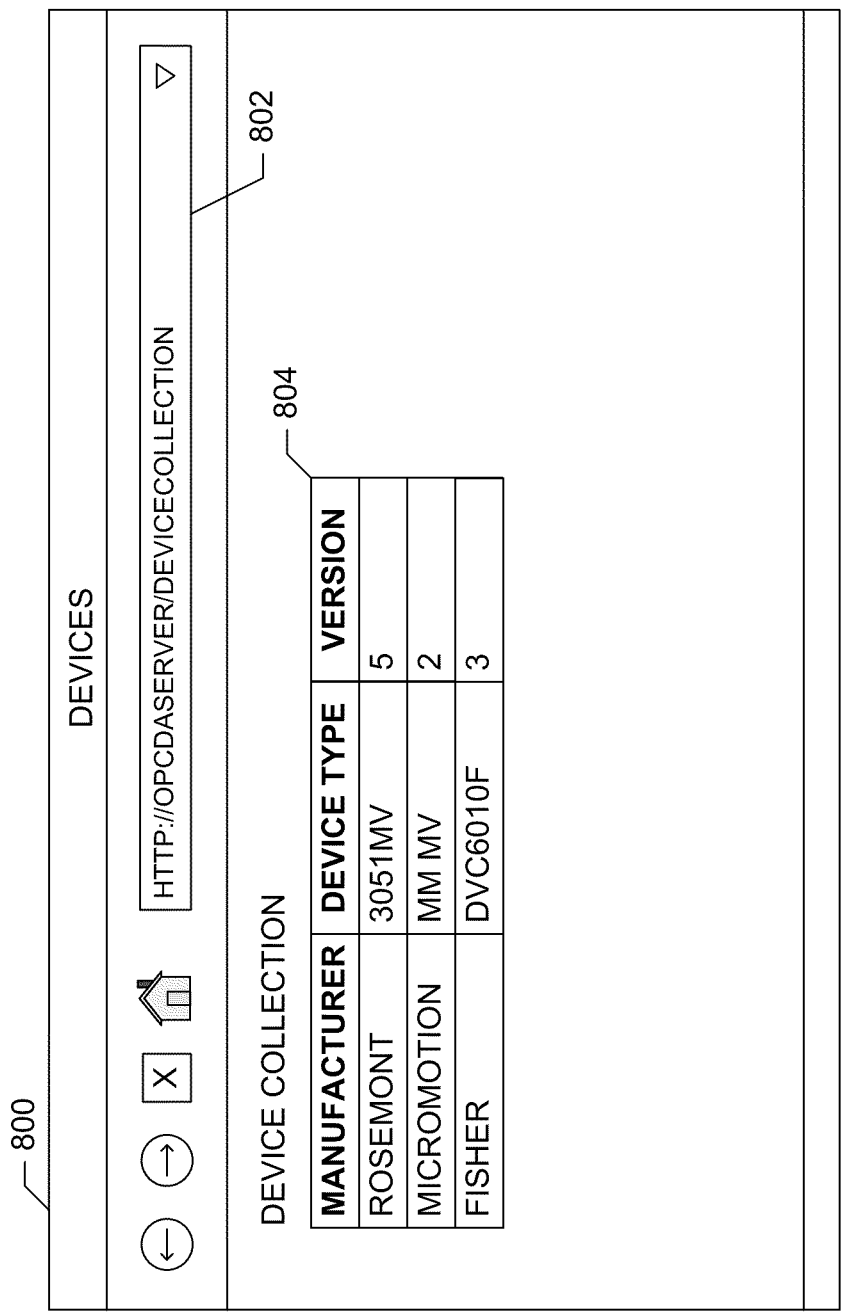
FIG. 8 shows an example interface displaying process data in a web browser.

FIG. 8 shows an example interface 800 displaying process data in a web browser. The interface 802 includes a navigation bar 802 that a user may use to enter a file location or path of process data. A template 804 shows a table of process data displayed within data fields. The template 804 includes data fields for Manufacturer, Device Type, and Version. A user may provide the HTTP://OPCDASERVER/DEVICE/DEVICECOLLECTION path to access or track process data associated with devices organized within a group. The process data within the template 804 may be accessed from an OPC server as an XML file:

```
<?xml version="1.0" encoding="UTF-8"?>
<?xml-stylesheet type="text/xsl" href="file:///Ccd.xsl"?>
<catalog>
    <device>
        <manufacturer>Rosemount</manufacturer>
        <type>3051MV</type>
        <version>5</version>
    </device>
    <device>
        <manufacturer>Micromotion</manufacturer>
        <type>MM MV</type>
        <version>2</version>
    </device>
    <device>
        <manufacturer>Fisher</manufacturer>
        <type>DVC6010F</type>
        <version>3</version>
    </device>
</catalog>
```

The example XML file shown above lists the manufacturer, device type, and version of the three devices under the <catalog> line. To display this information in the interface 800, the example wrapper 110 may convert the XML file to a XSLT file that specifies the template 804 for displaying the process data. The converted XSLT file may include:

```
<?xml version="1.0" encoding="ISO-8859-1"?>
<!-- Edited by XMLSpy ® -->
<xsl:stylesheet version="1.0" xmlns:xsl=
"http://www.w3.org/1999/XSL/Transform">
    <xsl:template match="/">
        <html>
            <body>
                <h2>My Device Collection</h2>
                <table border="1">
                    <tr bgcolor="#9acd32">
                        <th>Manufacturer</th>
                        <th>Device Type</th>
                        <th>Version</th>
                    </tr>
                    <xsl:for-each select="catalog/device">
                        <tr>
                            <td>
                                <xsl:value-of select="manufacturer"/>
                            </td>
                            <td>
                                <xsl:value-of select="type"/>
                            </td>
                            <td>
                                <xsl:value-of select="version"/>
                            </td>
                        </tr>
                    </xsl:for-each>
                </table>
            </body>
        </html>
    </xsl:template>
</xsl:stylesheet>
```

The line <xsl:stylesheet version="1.0" xmlns:xsl="http://www.w3.org/1999/XSL/Transform"> specifies the template 804 to be displayed in the interface 800. The example wrapper 110 may determine this template based on information (e.g., target display information, object type, etc) received from the interface 800. The XSLT file also specifies the column headers (e.g., Manufacturer, Device Type, and Version) for the template 804 and instructions (e.g., <xsl:value-of select="manufacturer"/>, <xsl:value-of select="type"/>, and <xsl:value-of select="version"/>) for formatting the process data into data fields.

FIGS. 9A, 9B, 9C, and 10 are flowcharts of an example method that may be carried out to implement the example security processor 202, the example session controller 204, the example web-based interface 122, the example data processor 206, the example data type database 208, the example OPC converter 120, the example adaptor 118, the example OPC server reference database 210 and/or, more generally, the wrapper 110 of FIGS. 1 and/or 2. The example method of FIGS. 9A, 9B, 9C, and/or 10 may be carried out by a processor, a controller and/or any other suitable processing device. For example, the example method of FIGS. 9A, 9B, 9C, and/or 10 may be embodied in coded instructions stored on any tangible computer-readable medium such as a flash memory, a CD, a DVD, a floppy disk, a ROM, a RAM, a programmable ROM (PROM), an electronically-programmable ROM (EPROM), an electronically-erasable PROM (EEPROM), an optical storage disk, an optical storage device, magnetic storage disk, a magnetic storage device, and/or any other medium that can be used to carry or store program code and/or instructions in the form of methods or data structures, and which can be accessed by a processor, a general-purpose or special-purpose computer, or other machine with a processor (e.g., the example processor platform P10 discussed below in connection with FIG. 11). Combinations of the above are also included within the scope of computer-readable media.

Methods comprise, for example, instructions and/or data that cause a processor, a general-purpose computer, special-purpose computer, or a special-purpose processing machine to implement one or more particular methods. Alternatively, some or all of the example method of FIGS. 9A, 9B, 9C, and/or 10 may be implemented using any combination(s) of ASIC(s), PLD(s), FPLD(s), discrete logic, hardware, firmware, etc.

Figure 9A:
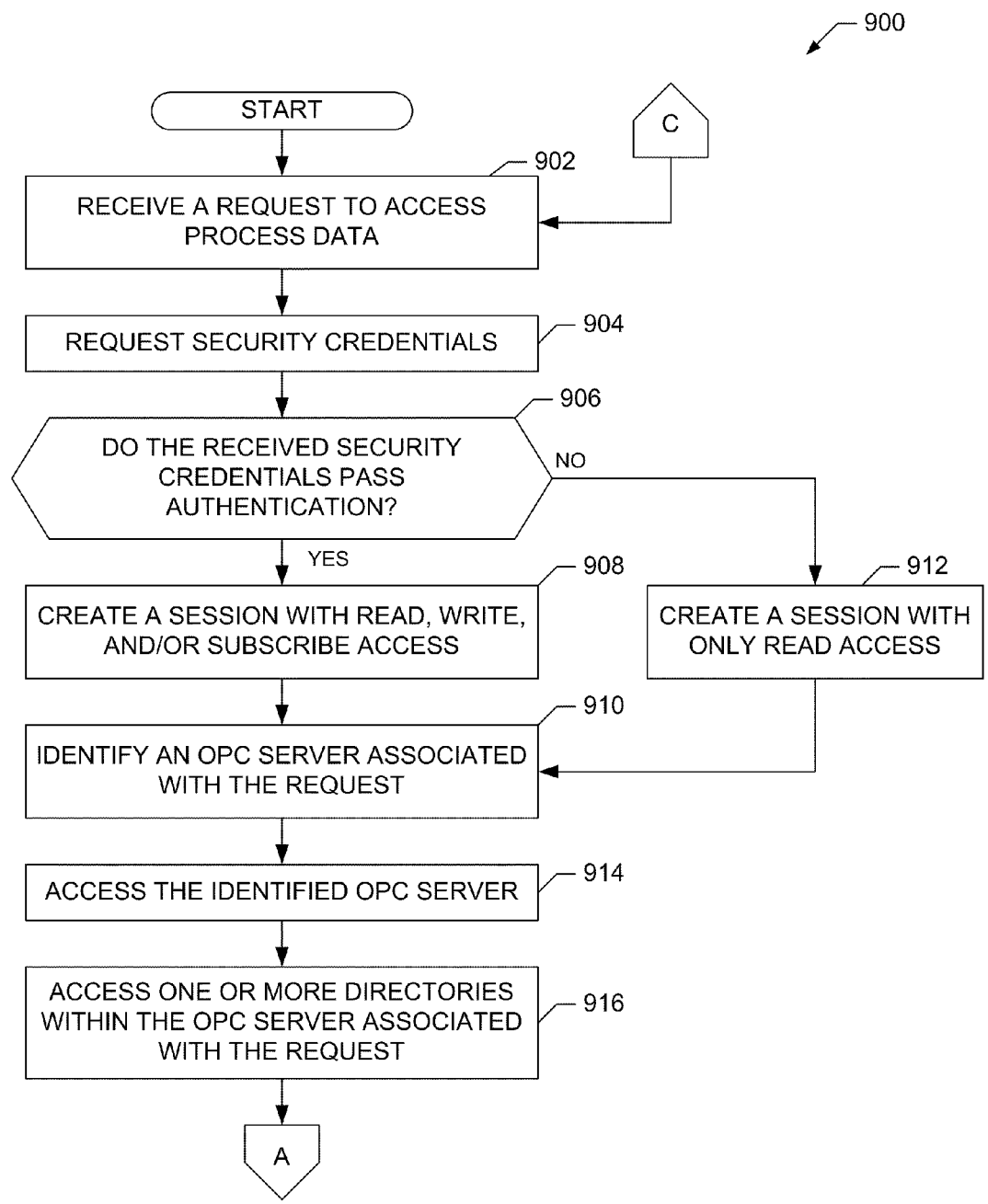
FIGS. 9A-9C and 10 are flowcharts of an example method that may be used to implement the example webpage server, the example OPC server, the example wrapper, a web-based interface, an OPC converter, and/or an adaptor of FIGS. 1 and/or 2.
Figure 9B:
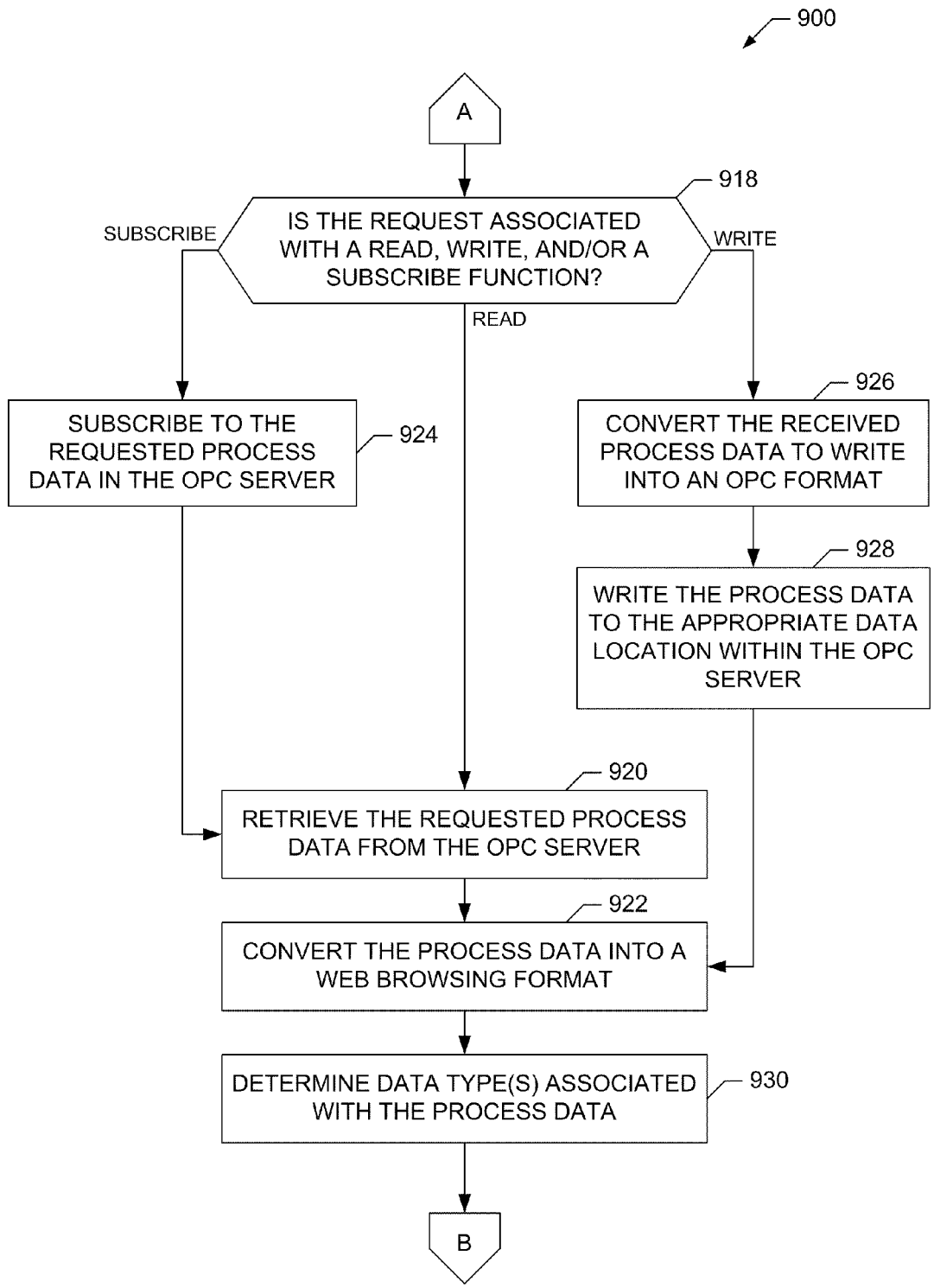
Figure 9C:
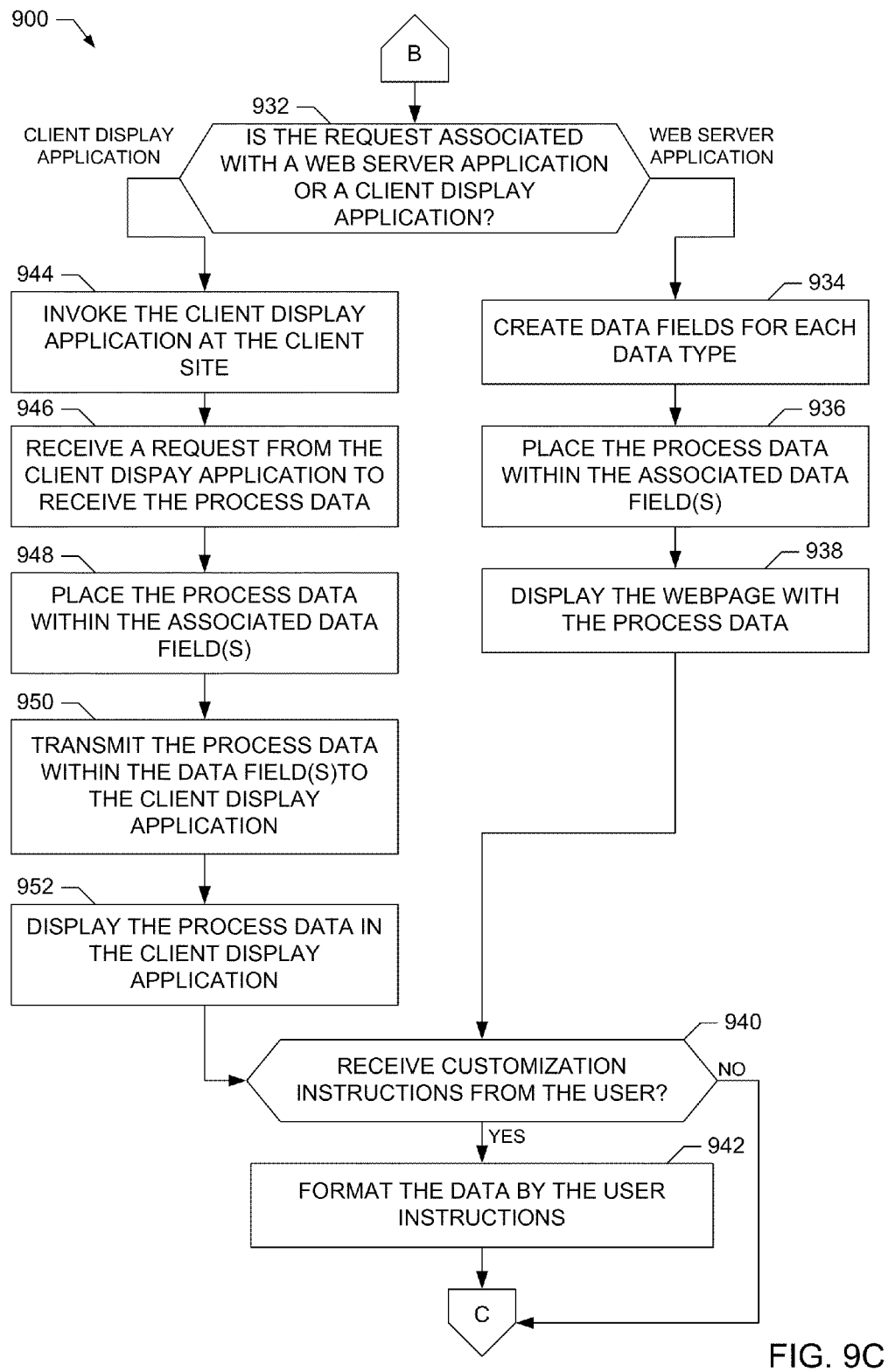

Also, some or all of the example methods of FIGS. 9A, 9B, 9C, and/or 10 may instead be implemented using manual operations or as any combination of any of the foregoing techniques, for example, any combination of firmware, software, discrete logic and/or hardware. Furthermore, many other methods of implementing the example operations of FIGS. 9A, 9B, 9C, and/or 10 may be employed. For example, the order of execution of the blocks may be changed, and/or one or more of the blocks described may be changed, eliminated, sub-divided, or combined. Additionally, any or all of the example method of FIGS. 9A, 9B, 9C, and/or 10 may be carried out sequentially and/or carried out in parallel by, for example, separate processing threads, processors, devices, discrete logic, circuits, etc.

The example method 900 of FIGS. 9A, 9B, and 9C enable a client to access process data stored on an OPC server. Multiple example methods 900 may be executed in parallel or series to access process data for multiple clients. Additionally, in examples where the requested process data may be stored on two or more OPC servers, an example method 900 may be implemented for each OPC server or, alternatively, a single example method 900 may be implemented for the OPC servers.

The example method 900 of FIG. 9A begins by receiving a request to access process data (block 902). The request may be received by the example security processor 202 and/or the web-based interface 122 of FIG. 2. The example method 900 then requests security credentials (e.g., the security processor) to access the process data (block 904). Security credentials may include a user name and password, an access code, a unique identifier, etc. In some examples, the security credentials may be included within the request. Next, the example method 900 determines if the received security credentials pass authentication (block 906). If the security credentials are proper and pass authentication, the example method 900 creates an access session with read, write and/or subscribe access depending on the request from the client (block 908). The example method 900 then identifies an OPC server associated with the request (e.g., the adaptor 118 accessing the OPC server reference database 210 of FIG. 2) (block 910)

However, if the example method 900 is not able to verify the security credentials (block 906), the example method 900 may create an access session with only read access (block 912). The example method 900 then identifies an OPC server associated with the request (block 910). Alternatively, if the example method 900 is not able to verify the security credentials (block 906), the example method 900 may deny the client access to the request process data.

The example method 900 of FIG. 9A continues by accessing (e.g., via the adaptor 118) the identified OPC server (block 914) and accessing one or more directories associated with the request (block 916). Additionally, in examples where the requested OPC data is located in more than one OPC server, the example method 900 may locate the directories and/or files located within the one or more OPC sever(s) (block 916). The example method 900 may locate the requested process data using endpoints, via manual client navigation, and/or by information provided within the request from the client. After accessing the location of the requested process data, the example method 900 then receives a request to read, write, and/or subscribe to the requested process data. In some examples, the request to access process data may include a request to read, write, and/or subscribe to the process data. In other examples, the client may send another request to access the process data via a read, write, and/or subscribe function.

The example method 900 of FIG. 9B determines if the request is associated with a read, a write, and/or a subscribe function (block 918). If the request is to read process data (block 918), the example method 900 continues by retrieving the requested process data (e.g., via the adaptor 118) from the associated OPC server(s) (block 920). The example method 900 then converts the process data from an OPC format into a web browsing and/or a programmatic application format (e.g., via the OPC converter 120) (block 922).

However, if the request is to subscribe to process data (block 918), the example method 900 continues by subscribing to the requested process data in the OPC server (block 924). The example method 900 may subscribe to the process data by setting an interval of time where a request message is sent to an OPC server to request the most recent process data. Upon subscribing to the process data, the example method 900 retrieves the requested process data from the OPC server (block 920). Further, the example method 900 may continue to retrieve the requested process data from the OPC server at the specified intervals. For each retrieval of process data, the example method 900 then converts the process data from an OPC format into a web browsing and/or a programmatic application format (e.g., via the OPC converter 120) (block 922).

However, if the request is to write process data (block 918), the example method 900 continues by receiving the written data value provided by the client and converting the data value into an OPC formatted value (e.g., via the OPC converter 120) (block 926). The example method 900 then writes the process data value to the appropriate data location within the OPC server (e.g., via the adaptor 118) (block 928). The example method 900 may then read the written process data in the OPC server and convert the process data in to a web browsing format (block 922). The example method 900 may read back a written value to provide evidence to a client that a written value was appropriately written to the OPC server.

Upon converting process data into an OPC format, the example method 900 continues by determining data type(s) (e.g., via the data processor 206) that are associated with the process data (block 930). The example method 900 of FIG. 9C then determines if the request from the client is associated with a web server application or a client display application (e.g., a programmatic application) (block 932). If the client request is associated with a web server application, the example method 900 creates and/or configures data fields (e.g., via the web-based interface 122) for each data type (block 934). The example method 900 then embeds and/or places the process data within the corresponding data field(s) and compiles the process data within the data field(s) (block 936). Next, the example method 900 enables the display of the data fields including the process data in a webpage that is accessed by a web browser operated by the client (block 938).

However, if the request from the client is associated with a client display application (block 932), the example method of FIG. 9C invokes the client display application at the client site (block 944). Invoking the client display application may include opening the application within a web browser used by the client to access the process data (e.g., an ActiveX or Silverlight™ application). Invoking the client display application may also include initializing a programmatic application to receive formatted process data and/or data fields. The example method 900 may then receive a request from the client display application indicating the application is invoked and ready to receive process data (block 946). The example method 900 then embeds and/or places the process data and/or associates the process data with the data field(s) (block 948) and transmits the process data and/or the data field(s) to the client display application (block 950). The example method 900 may also select a template for the data fields(s) based on types of the process data and/or a display type of the process data. Upon receiving the process data, the example method 900 then ensures that the client display application configures the data fields to show the corresponding process data within an interface and/or display of the client display application block 952).

The example method 900 of FIG. 9C continues by determining if the client customized any portion of the process data and/or the data field(s) (block 940). If the example method 900 determines that the client did not customize the process data and/or the data field(s), the example method 900 reverts back to receiving a request to access process data from the same and/or a different client (block 902). However, if the example method 900 determines that the client customized the process data and/or the data field(s), the example method 900 stores the customization data (block 942). The example method 900 stores the customization information so that the process data can be displayed in the customized format when the same client accesses the same process data at a different time. The example method 900 then reverts back to receiving a request to access process data from the same and/or a different client (block 902).

Figure 10:
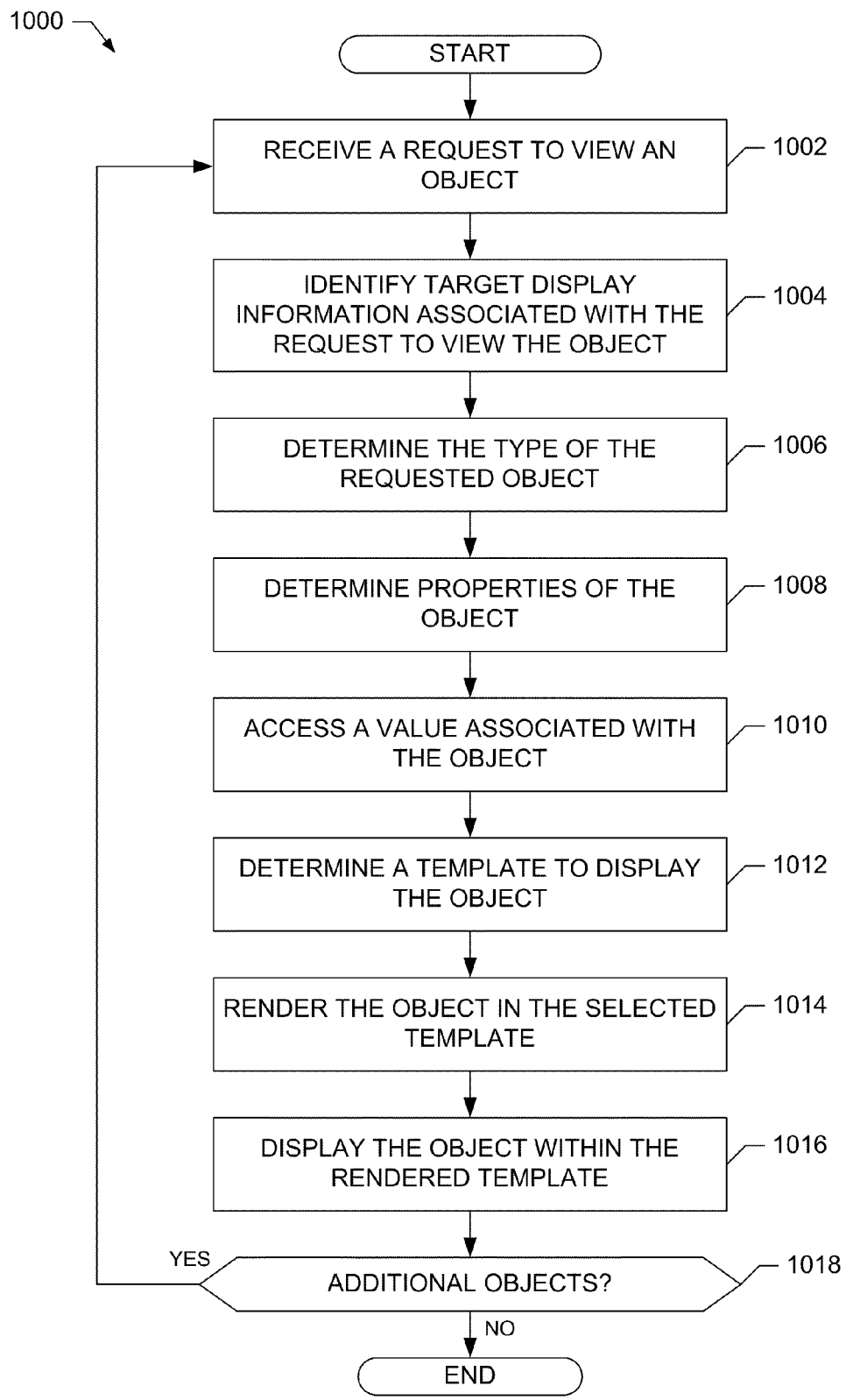

The example method 1000 of FIG. 10 determines a template and/or data fields for displaying process data received from an OPC server. Multiple example methods 1000 may be executed in parallel or series to render templates for multiple clients. Additionally, in examples where the requested process data may be stored on two or more OPC servers, an example method 1000 may be implemented for each OPC server or, alternatively, a single example method 1000 may be implemented for the OPC servers.

The example method 1000 of FIG. 10 begins by receiving in the wrapper 110 a request to view an object (e.g., process data) (block 1002). The object may include a field device and/or process data associated with a field device. The example method 1000 (e.g., via the web-based interface 122) may identify target display information associated with the request (block 1004). The target display information may be included within the request and/or may be transmitted separately by a web browser or client application. Next, the example method 1000 (e.g., via the web-based interface 122, the adaptor 118, and/or the data processor 206) determines a type of the requested object (block 1006), properties associated with the object (block 1008), and/or accesses process data (e.g., value(s) associated with the object (block 1010). Accessing the process data includes accessing an OPC server as described in conjunction with FIGS. 9A-9C.

The example method 1000 continues by determining (e.g., via the data processor 206) a template to display the object based on the object type, the properties, the process data, and/or the target display information (block 1012). The example method 1000 (e.g., via the web-based interface 122) may link and/or insert the object (e.g., the process data) into corresponding data fields within the template. Next, the example method 1000 (e.g., via the web-based interface 122 renders the object and/or process data associated with the object in the selected template (block 1014). The example method 1000 (e.g., via the web-based interface 122) displays the object and/or process data associated with the object within a template displayed within an interface (block 1016). The example method 1000 (e.g., via the web-based interface 122) may determine if there are additional objects to be displayed (block 1018). If the example method 1000 determines there are additional objects, the example method 1000 receives the additional objects (block 1002). If the example method 1000 determines there are no additional objects, the example method 1000 ends.

Figure 11:
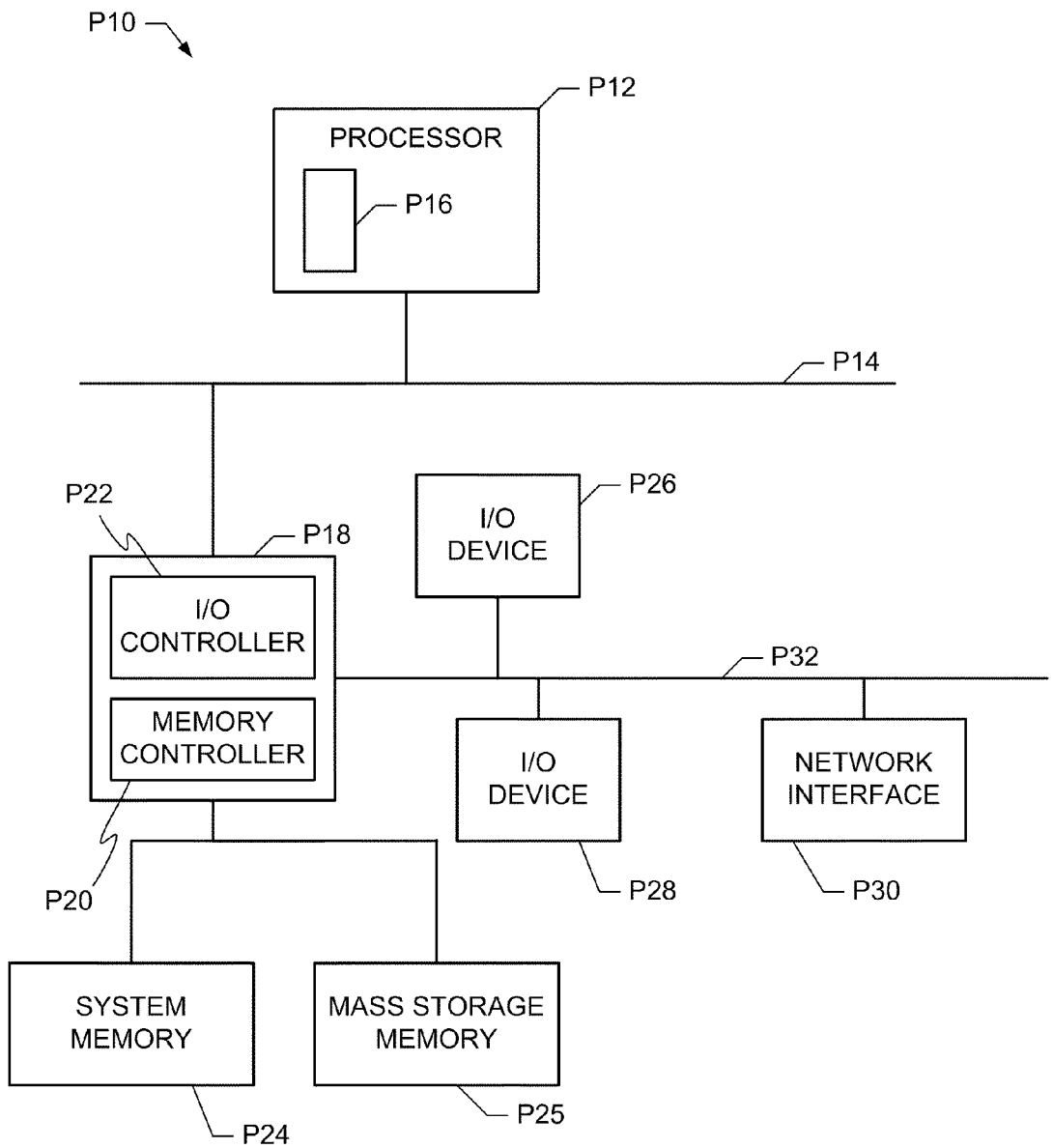
FIG. 11 is a block diagram of an example processor system that may be used to implement the example methods and apparatus described herein.

FIG. 11 is a block diagram of an example processor system P10 that may be used to implement the example methods and apparatus described herein. For example, processor systems similar or identical to the example processor system P10 may be used to implement the example security processor 202, the example session controller 204, the example web-based interface 122, the example data processor 206, the example data type database 208, the example OPC converter 120, the example adaptor 118, the example OPC server reference database 210 and/or, more generally, the wrapper 110 of FIGS. 1 and/or 2. Although the example processor system P10 is described below as including a plurality of peripherals, interfaces, chips, memories, etc., one or more of those elements may be omitted from other example processor systems used to implement one or more of the example security processor 202, the example session controller 204, the example web-based interface 122, the example data processor 206, the example data type database 208, the example OPC converter 120, the example adaptor 118, the example OPC server reference database 210 and/or, more generally, the wrapper 110.

As shown in FIG. 11 the processor system P10 includes a processor P12 that is coupled to an interconnection bus P14. The processor P12 includes a register set or register space P16, which is depicted in FIG. 11 as being entirely on-chip, but which could alternatively be located entirely or partially off-chip and directly coupled to the processor P12 via dedicated electrical connections and/or via the interconnection bus P14. The processor P12 may be any suitable processor, processing unit or microprocessor. Although not shown in FIG. 11, the system P10 may be a multi-processor system and, thus, may include one or more additional processors that are identical or similar to the processor P12 and that are communicatively coupled to the interconnection bus P14.

The processor P12 of FIG. 11 is coupled to a chipset P18, which includes a memory controller P20 and a peripheral input/output (I/O) controller P22. As is well known, a chipset typically provides I/O and memory management functions as well as a plurality of general purpose and/or special purpose registers, timers, etc. that are accessible or used by one or more processors coupled to the chipset P18. The memory controller P20 performs functions that enable the processor P12 (or processors if there are multiple processors) to access a system memory P24 and a mass storage memory P25.

The system memory P24 may include any desired type of volatile and/or non-volatile memory such as, for example, static random access memory (SRAM), dynamic random access memory (DRAM), flash memory, read-only memory (ROM), etc. The mass storage memory P25 may include any desired type of mass storage device. For example, if the example processor system P10 is used to implement the wrapper 110 (FIG. 2), the mass storage memory P25 may include a hard disk drive, an optical drive, a tape storage device, etc. Alternatively, if the example processor system P10 is used to implement the example data type database 210 and/or the example OPC server reference database 210, the mass storage memory P25 may include a solid-state memory (e.g., a flash memory, a RAM memory, etc.), a magnetic memory (e.g., a hard drive), or any other memory suitable for mass storage in the example data type database 210 and/or the example OPC server reference database 210.

The peripheral I/O controller P22 performs functions that enable the processor P12 to communicate with peripheral input/output (I/O) devices P26 and P28 and a network interface P30 via a peripheral I/O bus P32. The I/O devices P26 and P28 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface P30 may be, for example, an Ethernet device, an asynchronous transfer mode (ATM) device, an 802.11 device, a DSL modem, a cable modem, a cellular modem, etc. that enables the processor system P10 to communicate with another processor system.

While the memory controller P20 and the I/O controller P22 are depicted in FIG. 11 as separate functional blocks within the chipset P18, the functions performed by these blocks may be integrated within a single semiconductor circuit or may be implemented using two or more separate integrated circuits.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols. For instance, each of the standards for internet and other packet-switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods, systems, and machine-accessible medium, the examples are not the only way to implement such systems, methods and machine-accessible medium. Therefore, although certain example methods, systems, and machine-accessible medium have been described herein, the scope of coverage of this patent is not limited thereto. On the contrary, this patent covers all methods, systems, and machine-accessible medium fairly falling within the scope of the appended claims either literally or under the doctrine of equivalents.

What is claimed is:

1. A method to access process data stored on a server, the method comprising:
    authenticating a request to access the process data stored on the server, the request originating from a first rendering device or a second rendering device;
    creating an access session, based on the authentication, to provide access for the first rendering device when the request originates from the first rendering device, and to provide access for the second rendering device when the request originates from the second rendering device;
    rejecting the request to access the process data from the first rendering device or the second rendering device prior to creating the access session for the respective first rendering device or second rendering device;
    identifying the server that stores the process data in response to the request to access the process data, wherein the server is associated with an interoperability data packing format, the process data generated by a field device of a process control system communicatively coupled to the server, the field device receiving inputs to control a process or measuring outputs of the process;
    determining which one of the first rendering device or the second rendering device originates the request based on first target display information or second target display information embedded in the request;
    converting the process data from a format associated with the interoperability data packing format to a first web browsing format associated with a first template that is tailored based on a type of the process data from the field device of the process control system and the first target display information when the first target display information is embedded in the request;
    converting the process data from the format associated with the interoperability data packing format to a second web browsing format associated with a second template that is tailored based on the type of the process data from the field device of the process control system and the second target display information when the second target display information is embedded in the request; and
    embedding the converted process data into a first data field in the first template for display via the first rendering device when the first target display information is embedded in the request, and a second data field in the second template for display via the second rendering device when the second target display information is embedded in the request, the second data field displayed via the second template differently than the first data field displayed via the first template.

2. The method as defined in claim 1, wherein identifying the server includes accessing a list that cross-references an identifier associated with the request.

3. The method as defined in claim 1, wherein the interoperability data packing format complies with an open packaging convention.

4. The method as defined in claim 1, wherein the first target display information comprises at least one of a type of web browser or a type of the first rendering device that is to display the process data.

5. The method as defined in claim 1, wherein embedding the converted process data into the first data field, when the first target display information is embedded in the request, includes:
    partitioning the converted process data by a data type;
    determining which data type is associated with each data field;
    creating a data field for each data type; and
    embedding the converted process data associated with each data type into a corresponding data field.

6. The method as defined in claim 5, wherein determining which data type is associated with each data field includes:
    determining metadata associated with each portion of the converted process data; and
    cross-referencing the metadata to the corresponding data field.

7. The method as defined in claim 1, wherein the request is from a client using a web browser.

8. The method as defined in claim 7, further comprising:
    embedding the first data field including the converted process data into a webpage when the first target display information is embedded in the request; and
    returning the webpage including the converted process data within the first data field to the client using the web browser to display the converted process data in the webpage.

9. The method as defined in claim 1, wherein the request is from a client using a client display application that is executed within a web browser.

10. The method as defined in claim 9, further comprising sending an instruction to the web browser that causes the client display application to access and display the first data field including the converted process data when the request originates from the first rendering device.

11. The method as defined in claim 1, wherein the server stores a first portion of the process data.

12. The method as defined in claim 11, further comprising:
identifying a second server that stores a second portion of the process data, wherein the second server is associated with the interoperability data packing format;
converting the second portion of the process data from the format associated with the interoperability data packing format to the first web browsing format to generate a second portion of the converted process data when the first target display information is embedded in the request; and
embedding the second portion of the converted process data into the first data field for display along with the first portion of the converted first process data via the first rendering device when the first target display information is embedded in the request.

13. The method as defined in claim 1, wherein the type of process data comprises at least one of server identification information, file directory organization information, numerical data, string data, status data of a control device, alarm data or data associated with the process control system.

14. The method as defined in claim 13, wherein the process data is generated by at least one of a valve, a pump, a fan, a heater, a cooler, a mixer, a thermometer, a pressure gauge, a concentration gauge, a fluid level meter, a flow meter or a vapor sensor.

15. An apparatus to access process data stored on a server, the apparatus comprising:
a security processor device to authenticate a request to access the process data stored on the server, the request originating from a first rendering device or a second rendering device;
a session controller to:
create an access session, based on the authentication, to provide access for the first rendering device when the request originates from the first rendering device, and to provide access for the second rendering device when the request originates from the second rendering device; and
reject the request to access the process data from the first rendering device or the second rendering device prior to creating the access session for the respective first rendering device or second rendering device;
an adaptor to identify the server that stores the process data in response to the request to access the process data via a web browser, wherein the server is associated with an interoperability data packing format, the process data generated by a field device of a process control system communicatively coupled to the server, the field device receiving inputs to control a process or measuring outputs of the process;
a converter to:
convert the process data from a format associated with the interoperability data packing format to a first web browsing format associated with a first template that is tailored based on a type of the process data from the field device of the process control system and first target display information when the first target display information is embedded in the request;
convert the process data from the format associated with the interoperability data packing form a to a second web browsing format with a second template that is tailored based on the type of the process data from the field device of the process control system and second target display information when the second target display information is embedded in the request; and
a web-based interface to:
determine which one of the first rendering device or the second rendering device originates the request based on the first target display information or the second target display information embedded in the request;
embed the converted process data into a first data field in the first template for display via the first rendering device when the first target display information is embedded in the request, and a second data field in the second template for display via the second rendering device when the second target display information is embedded in the request, the second data field displayed via the second template differently than the first data field displayed via the first template.

16. The apparatus as defined in claim 15, wherein the adaptor identifies the server by accessing a list that cross-references an identifier associated with the request to the server.

17. The apparatus as defined in claim 15, wherein the web-based interface is to receive the request to access the process data via the web browser.

18. The apparatus as defined in claim 17, wherein the request is from a client using the web browser.

19. The apparatus as defined in claim 18, wherein the web-based interface is to:
embed the first data field including the converted process data into a webpage when the first target display information is embedded in the request; and
return the webpage including the converted process data within the first data field to the client using the web browser to display the converted process data in the webpage.

20. The apparatus as defined in claim 17, wherein the request is from a client using a client display application that is executed within the web browser.

21. The apparatus as defined in claim 20, wherein the web-based interface is to send an instruction to the web browser that causes the client display application to access and display the first data field including the converted process data when the request originates from the first rendering device.

22. The apparatus as defined in claim 15, wherein the web-based interface is to embed the converted process data into the first data field, when the first target display information is embedded in the request, by:
partitioning the converted process data by a data type;
determining which data type is associated with each data field;
creating a data field for each data type; and
embedding the converted process data associated with each data type into a corresponding data field.

23. The apparatus as defined in claim 22, wherein determining which data type is associated with each data field includes a data processor to:
determine metadata associated with each portion of the converted process data; and
cross-reference the metadata to the corresponding data field.

24. A non-transitory machine readable storage medium comprising instructions stored thereon that, when executed, cause a machine to, at least:
- authenticate a request to access a process data stored on a server, the request originating from a first rendering device or a second rendering device;
- create an access session, based on the authentication, to provide access for the first rendering device when the request originates from the first rendering device, and to provide access for the second rendering device when the request originates from the second rendering device;
- reject the request to access the process data from the first rendering device or the second rendering device prior to creating the access session for the respective first rendering device or second rendering device;
- identify the server that stores the process data in response to the request to access the process data, wherein the server is associated with an interoperability data packing format, the process data generated by a field device of a process control system communicatively coupled to the server, the field device receiving inputs to control a process or measuring outputs of the process;
- determine which one of the first rendering device or the second rendering device originates the request based on first target display information or second target display information embedded in the request;
- convert the process data from a format associated with the interoperability data packing format to a first web browsing format associated with a first template that is tailored based on a type of the process data from the field device of the process control system and the first target display information when the first target display information is embedded in the request;
- convert the process data from the format associated with the interoperability data packing format to a second web browsing format associated with a second template that is tailored based on the type of the process data from the field device of the process control system and the second target display information when the second target display information is embedded in the request; and
- embed the converted process data into a first data field in the first template for display via the first rendering device when the first target display information is embedded in the request, and a second data field in the second template for display via the second rendering device when the second target display information is embedded in the request, the second data field displayed via the second template differently than the first data field displayed via the first template.

* * * * *